United States Patent
Fukuhara et al.

(10) Patent No.: US 8,433,147 B2
(45) Date of Patent: Apr. 30, 2013

(54) ENCODING APPARATUS AND METHOD, AND DECODING APPARATUS AND METHOD

(75) Inventors: Takahiro Fukuhara, Kanagawa (JP); Katsutoshi Ando, Kanagawa (JP)

(73) Assignee: Sony Corporation, Tokyo (JP)

( * ) Notice: Subject to any disclaimer, the term of this patent is extended or adjusted under 35 U.S.C. 154(b) by 566 days.

(21) Appl. No.: 12/720,243

(22) Filed: Mar. 9, 2010

(65) Prior Publication Data

US 2010/0254619 A1    Oct. 7, 2010

(30) Foreign Application Priority Data

Apr. 7, 2009  (JP) ................................ 2009-092683

(51) Int. Cl.
  *G06K 9/36*   (2006.01)
(52) U.S. Cl.
  USPC ........... 382/232; 382/233; 382/247; 382/250; 382/251
(58) Field of Classification Search .................. 382/232, 382/233, 247, 248, 240, 250, 251, 274; 345/555; 348/384.1; 358/426.01; 708/203; 375/122
  See application file for complete search history.

(56) References Cited

U.S. PATENT DOCUMENTS

| | | | | |
|---|---|---|---|---|
| 5,418,629 A | * | 5/1995 | Miura | .......................... 358/471 |
| 5,592,225 A | * | 1/1997 | Kurobe | .................... 375/240.03 |
| 5,644,506 A | | 7/1997 | Okazaki et al. | |
| 5,818,607 A | * | 10/1998 | Nakamura et al. | ........ 358/426.05 |

FOREIGN PATENT DOCUMENTS

| | | |
|---|---|---|
| JP | 3516450 | 1/2004 |
| JP | 3594017 | 9/2004 |

* cited by examiner

*Primary Examiner* — Ali Bayat
(74) *Attorney, Agent, or Firm* — Oblon, Spivak, McClelland, Maier & Neustadt, L.L.P.

(57) ABSTRACT

An encoding apparatus includes: a first processing unit performing predetermined first processing of image data to be encoded before performing encoding; an encoding unit performing the encoding of the image data of which the first processing has been performed by the first processing unit to generate a code stream; a second processing unit performing predetermined second processing of the code stream generated through the encoding of the image data performed by the encoding unit; and a control unit controlling a processing speed of the encoding performed by the encoding unit in accordance with a processing speed of the first processing by the first processing unit and a processing speed of the second processing by the second processing unit.

11 Claims, 30 Drawing Sheets

DIVISION LEVEL = 3
( H: HIGH BAND, L: LOW BAND )

CODE BLOCK
(EXAMPLE) 64 × 64

| "ALL_NUM_BP" | "Target_Speed" |
|---|---|
| ~50 | X0.02 |
| 51~100 | X0.1 |
| 101~500 | X1.5 |
| 501~1000 (="Ref_ALL_NUM_BP") | X1.0 |
| 1001~1500 | X1.5 |
| 1501~1800 | X1.8 |
| 1801~ | X2.0 |

ENCODING APPARATUS AND METHOD, AND DECODING APPARATUS AND METHOD

BACKGROUND OF THE INVENTION

1. Field of the Invention

The present invention relates to an encoding apparatus and method, and a decoding apparatus and method. In particular, the present invention relates to an encoding apparatus and method, and a decoding apparatus and method, which can effectively utilize hardware resources in an encoding process or a decoding process.

2. Description of the Related Art

In an archive system or image database in the related art, an uncompressed image, a so called a master image, is stored and maintained, and the master image is read and compressed by an encoder. Also, a file of the result of compression is transmitted through a network or the like, or stored in a recording medium (for example, see Japanese Patent No. 3516450 and Japanese Patent No. 3594017).

Also, for example, a code stream in which image data is compressed is received through a network and expanded by a decoder. Image data as the result of expansion is transmitted through a network or the like, or stored in a recording medium.

SUMMARY OF THE INVENTION

However, in such a system, it may be considered that the reading speed or the recording speed of the recording medium is not sufficiently high compared to the processing speed of the encoder or decoder. In the same manner, it may be considered that the transmission speed of the network is not sufficiently high compared to the processing speed of the encoder or decoder.

That is, it may be considered that compared to the processing speed of the encoder or decoder, the processing speed of its pre-processing unit or post-processing unit is not sufficiently high. In other words, for example, it may be considered that with respect to the processing speed of the encoder or decoder, the input speed of image data to be processed to the encoder, the input speed of a code stream to be processed to the decoder, the output speed of the code stream as the result of processing from the encoder, or the output speed of the image data as the result of processing from the decoder is not sufficiently high.

In this case, the processing speed of the whole system is determined by the processing speed of the pre-processing unit or the post-processing unit, and thus even though the processing speed of the encoder or decoder is made to be higher, the processing speed of the whole system may not be improved, i.e. the load may be unnecessarily increased.

Also, in contrast, it may be considered that the processing speed of the encoder or decoder is not sufficiently high compared to the processing speed in its pre-processing unit and the processing speed in its post-processing unit.

In this case, since the processing speed of the whole system is determined by the processing speed of the encoder or decoder, the processing speed of the whole system may be unnecessarily reduced by the processing speed of the encoder or decoder, which can be made to be higher.

As described above, the individual control of the processing speeds of the respective processing units without considering relations between the processing speeds of the respective processing units may not improve the processing speed of the whole system, and may cause hardware resources to be unnecessarily consumed.

Particularly, in the case of a reversible compression, its compression rate is significantly changed depending upon the degree of difficulty of an image, and thus the processing speed of the encoding or decoding may be greatly changed by the image. Accordingly, the relations between the processing speeds of the respective processing units become more unstable, and thus the hardware resources may be further unnecessarily consumed.

In view of the above situation, it is desirable to make it possible to effectively utilize hardware resources in an encoding process or a decoding process.

According to an embodiment of the present invention, there is provided an encoding apparatus including: first processing means for performing predetermined first processing of image data to be encoded before performing encoding; encoding means for performing the encoding of the image data of which the first processing has been performed by the first processing means to generate a code stream; second processing means for performing predetermined second processing of the code stream generated through the encoding of the image data performed by the encoding means; and control means for controlling a processing speed of the encoding performed by the encoding means in accordance with a processing speed of the first processing by the first processing means and a processing speed of the second processing by the second processing means.

In the encoding apparatus according to an embodiment of the present invention, the control means lowers the processing speed of the encoding if the processing speed of the encoding is higher than the processing speed of the first processing.

In the encoding apparatus according to an embodiment of the present invention, the control means lowers the processing speed of the encoding if the processing speed of the encoding is higher than the processing speed of the second processing.

In the encoding apparatus according to an embodiment of the present invention, the control means raises the processing speed of the encoding if the processing speed of the encoding is lower than the processing speed of the second processing.

In the encoding apparatus according to an embodiment of the present invention, the encoding means is implemented by a processor having a plurality of cores, and the control means controls the processing speed of the encoding by increasing and decreasing the number of cores allocated to the encoding.

In the encoding apparatus according to an embodiment of the present invention, the encoding means performs the encoding by a reversible encoding method.

In the encoding apparatus according to an embodiment of the present invention, the encoding means performs the encoding by JPEG2000 type reversible encoding method, and the control means acquires the number of zero-bit planes for each code block of the image data, calculates the total sum of the numbers of effective-bit planes for each picture from the number of zero-bit planes, and controlling the processing speed of the encoding performed by the encoding means by using the total sum of the numbers of the effective-bit planes for each picture.

The encoding apparatus according to an embodiment of the present invention further includes an adding means for adding load control information regarding the control of the processing speed of the encoding performed by the control unit to the code stream.

According to another embodiment of the present invention, there is provided an encoding method including the steps of: causing a first processing means of an encoding apparatus to perform predetermined first processing of image data to be encoded before performing encoding; causing an encoding means of the encoding apparatus to perform the encoding of the image data of which the first processing has been performed to generate a code stream; causing a second processing means of the encoding apparatus to perform predetermined second processing of the code stream generated through the encoding of the image data performed by the encoding means; and causing a control means of the encoding apparatus to control a processing speed of the encoding performed by the encoding means in accordance with a processing speed of the first processing and a processing speed of the second processing.

According to still another embodiment of the present invention, there is provided a decoding apparatus including: a first processing means for performing predetermined first processing of a code stream to be decoded, which has been generated through encoding of image data, before performing decoding; a decoding means for performing the decoding of the code stream of which the first processing has been performed by the first processing means to generate image data; a second processing means for performing predetermined second processing of the image data generated through the decoding performed by the decoding means; and a control means for controlling a processing speed of the decoding performed by the decoding means in accordance with a processing speed of the first processing by the first processing means and a processing speed of the second processing by the second processing means.

In the decoding apparatus according to still another embodiment of the present invention, the control means raises the processing speed of the decoding if the processing speed of the decoding is lower than the processing speed of the first processing.

In the decoding apparatus according to still another embodiment of the present invention, the control means lowers the processing speed of the decoding if the processing speed of the decoding is higher than the processing speed of the first processing.

In the decoding apparatus according to still another embodiment of the present invention, the control means lowers the processing speed of the decoding if the processing speed of the decoding is higher than the processing speed of the second processing.

In the decoding apparatus according to still another embodiment of the present invention, the decoding means is implemented by a processor having a plurality of cores, and the control means controls the processing speed of the decoding by increasing and decreasing the number of cores allocated to the decoding.

In the decoding apparatus according to still another embodiment of the present invention, the control means controls the processing speed of the decoding performed by the decoding means on the basis of a file size of the code stream.

According to still another embodiment of the present invention, there is provided a decoding method including the steps of: causing a first processing means of a decoding apparatus to perform predetermined first processing of a code stream to be decoded, which has been generated through encoding of image data, before performing decoding; causing a decoding means of the decoding apparatus to perform the decoding of the code stream of which the first processing has been performed to generate image data; causing a second processing means of the decoding apparatus to perform predetermined second processing of the image data generated through the decoding performed by the decoding means; and causing a control means of the decoding apparatus to control a processing speed of the decoding performed by the decoding means in accordance with a processing speed of the first processing and a processing speed of the second processing.

In an embodiment of the present invention, predetermined first processing of image data to be encoded is performed before performing encoding, the encoding of the image data, of which the first processing has been performed, is performed to generate a code stream, predetermined second processing of the code stream generated through the encoding of the image data is performed, and the processing speed of the encoding is controlled in accordance with the processing speed of the first processing and the processing speed of the second processing.

In still another embodiment of the present invention, predetermined first processing of a code stream to be decoded, which has been generated through encoding of image data, is performed before performing decoding, the decoding of the code stream, of which the first processing has been performed, is performed to generate image data, predetermined second processing of the image data generated through the decoding of the code stream is performed, and the processing speed of the decoding is controlled in accordance with the processing speed of the first processing and the processing speed of the second processing.

According to the embodiments of the present invention, information can be processed. Particularly, hardware resources can be effectively utilized in the encoding process or the decoding process.

DESCRIPTION OF THE PREFERRED EMBODIMENTS

Hereinafter, best modes (hereinafter, referred to as embodiments) for carrying out the present invention will be described. In addition, the explanation will be made in the following order.

1. First embodiment (encoding control processing)
2. Second embodiment (encoding control processing in the case where an encoding method is JPEG2000)
3. Third embodiment (encoding control processing allocating hardware resources)
4. Fourth embodiment (encoding control processing that provides load information to decoding control processing)
5. Fifth embodiment (decoding control processing)
6. Sixth embodiment (decoding control processing in the case where an encoding method is JPEG2000)
7. Seventh embodiment (decoding control processing allocating hardware resources)

1. First Embodiment

Configuration of an Encoding Apparatus

Figure 1:
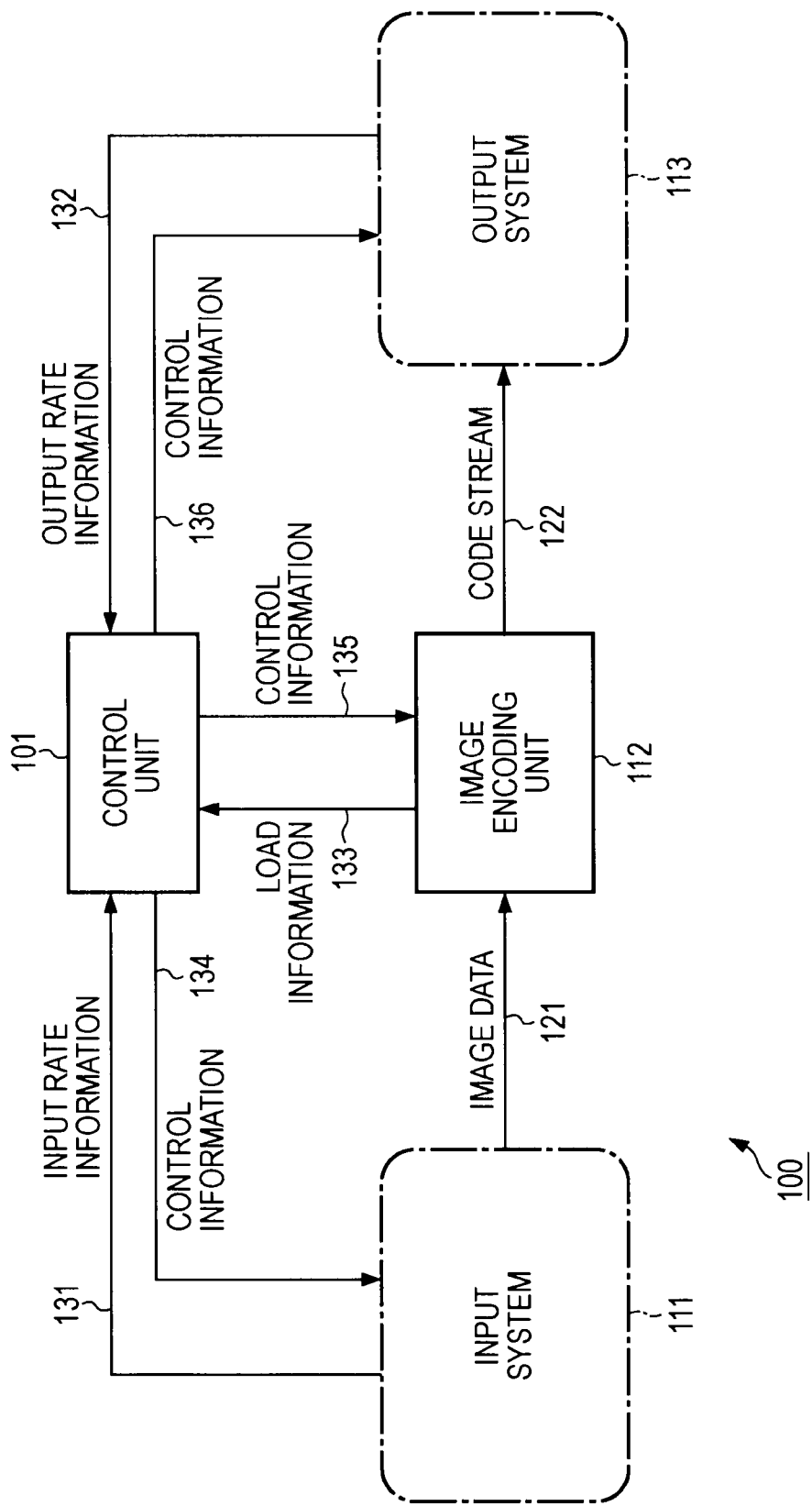
FIG. 1 is a block diagram illustrating a main configuration example of an encoding apparatus to which the present invention is applied.

FIG. 1 is a block diagram illustrating a main configuration example of an encoding apparatus to which the present invention is applied. The encoding apparatus 100 illustrated in FIG. 1 is an apparatus that generates a code stream by encoding image data in a predetermined encoding method. The encoding apparatus 100 includes a control unit 101, an input system 111, an image encoding unit 112, and an output system 113.

The control unit 101 performs an encoding-related processing of image data by controlling the input system 111 to the output system 113.

The input system 111 is a system that is composed of one or plural processing units implemented by an arbitrary hardware resource. The input system 111 is controlled by the control unit 101, and performs an arbitrary process, such as reading of image data to be encoded from a recording medium, receiving of image data transmitted from another apparatus through a network, and the like. Also, the input system 111 is controlled by the control unit 101, and supplies the processed image data to the image encoding unit 112 as indicated by an arrow 121.

The image encoding unit 112 is controlled by the control unit 101, and acquires the image data supplied from the input system 111 as indicated by the arrow 121. Also, the image encoding unit 112 is controlled by the control unit 101, and generates a code stream by encoding the acquired image data in a predetermined method. Further, the image encoding unit 112 is controlled by the control unit 101, and supplies the generated code stream to the output system 113 as indicated by an arrow 122.

The output system 113 is a system that is composed of one or plural processing units implemented by an arbitrary hardware resource. The output system 113 is controlled by the control unit 101, and acquires the code stream supplied from the image encoding unit 112 as indicated by the arrow 122. Also, the output system 113 is controlled by the control unit 101, and performs an arbitrary process, such as, for example, storing of the acquired code stream in a recording medium, transmitting of the code stream to another apparatus through a network, and the like.

The control unit 101, as indicated by an arrow 131, acquires input rate information that indicates the processing speed of the process that is performed by the input system 111 from the input system 111. In the same manner, the control unit 101, as indicated by an arrow 132, acquires output rate information that indicates the processing speed of the process that is performed by the output system 113 from the output system 113. Further, the control unit 101, as indicated by an arrow 133, acquires load information 133 that indicates the load amount of the image encoding performed by the image encoding unit 112 from the image encoding unit 112.

Also, the control unit 101, as indicated by an arrow 134, controls the processing of the input system 111 by supplying control information to the input system 111. Further, the control unit 101, as indicated by an arrow 135, controls the image encoding by supplying the control information to the image encoding unit 112. Also, the control unit 101, as indicated by an arrow 136, controls the processing of the output system 113 by supplying the control information to the output system 113.

At this time, the control unit 101 determines the processing speed of the image encoding performed by the image encoding unit 112 on the basis of the input rate information, the output rate information, and the load information.

Here, the processing speed is a processing amount (so called throughput) per unit time. This processing speed, for example, is indicated by a data amount (so called a rate) of the image data (i.e. code stream) processed per unit time. That is, the input rate information is information that indicates the data amount (i.e. input rate) of the image data processed per unit time in the input system 111. In the same manner, the output rate information is information that indicates the data amount (i.e. output rate) of the image data processed per unit time in the output system 113.

The input rate information may be the specification of hardware resources allocated to the input system 111, or may be the measurement result of the speed of the processing actually performed in the input system 111. In the same manner, the output rate information may be the specification of hardware resources allocated to the output system 113, or may be the measurement result of the speed of the processing actually performed in the output system 113.

Also, the input rate information and the output rate information, for example, may be information that directly indicates the throughput such as the data amount processed per unit time, or may be information that indirectly indicates the throughput, which can be converted into the processing amount per unit time, such as the amount of hardware resource. Of course, the input rate information and the output rate information may include a plurality of information, such as the joint use of the specification of the hardware resources and the measurement result of the speed, or the like.

The load information is predicted information that indicates the size of the predicted load in the image encoding performed by the image encoding unit 112. In other words, the load information indicates the predicted value of the processing speed (i.e. throughput) of the image encoding. More specifically, the load information is composed of, for example, information that indicates the degree of difficulty in encoding the image data, throughput of the past image data, information that indicates the allocated amount of hardware resource, or other set information. That is, the load information may be any information from which the predicted value of the throughput of the image encoding process can be obtained.

The control unit 101 compares the processing speed of the image encoding process obtained from the load information with the processing speed of the processing of the input system 111 or the processing speed of the processing of the output system 113, and controls the processing speed of the image encoding process on the basis of the result of comparison.

For example, the control unit 101, if the processing speed of the image encoding process is higher than the processing speed of the processing of the input system 111, lowers the processing speed of the image encoding process to the processing speed of the input system 111. Also, if the processing speed of the image encoding process is higher than the processing speed of the processing of the output system 113, the control unit 101, for example, lowers the processing speed of the image encoding process to the processing speed of the output system 113. Further, for example, if the processing speed of the image encoding process is lower than the processing speed of the processing of the output system 113, the control unit 101, for example, raises the processing speed of the image encoding process up to the processing speed of the output system 113.

As described above, the control unit 101 determines the processing speed of the image encoding process in consideration of the processing speed of the processing performed by the pre-processing unit or the post-processing unit of the image encoding unit 112 such as the processing speeds of the processing performed by the input system 111 and the output system 113, and thus can control the processing speed of the image encoding process to improve the processing speed of the whole encoding apparatus 100.

Through the above-described control, the encoding apparatus 100 can allocate the hardware resources to the encoding processing. That is, the encoding apparatus 100 can utilize the hardware resources more effectively in the encoding processing.

Next, a concrete example of the configuration of the encoding apparatus 100 will be described.

Figure 2:
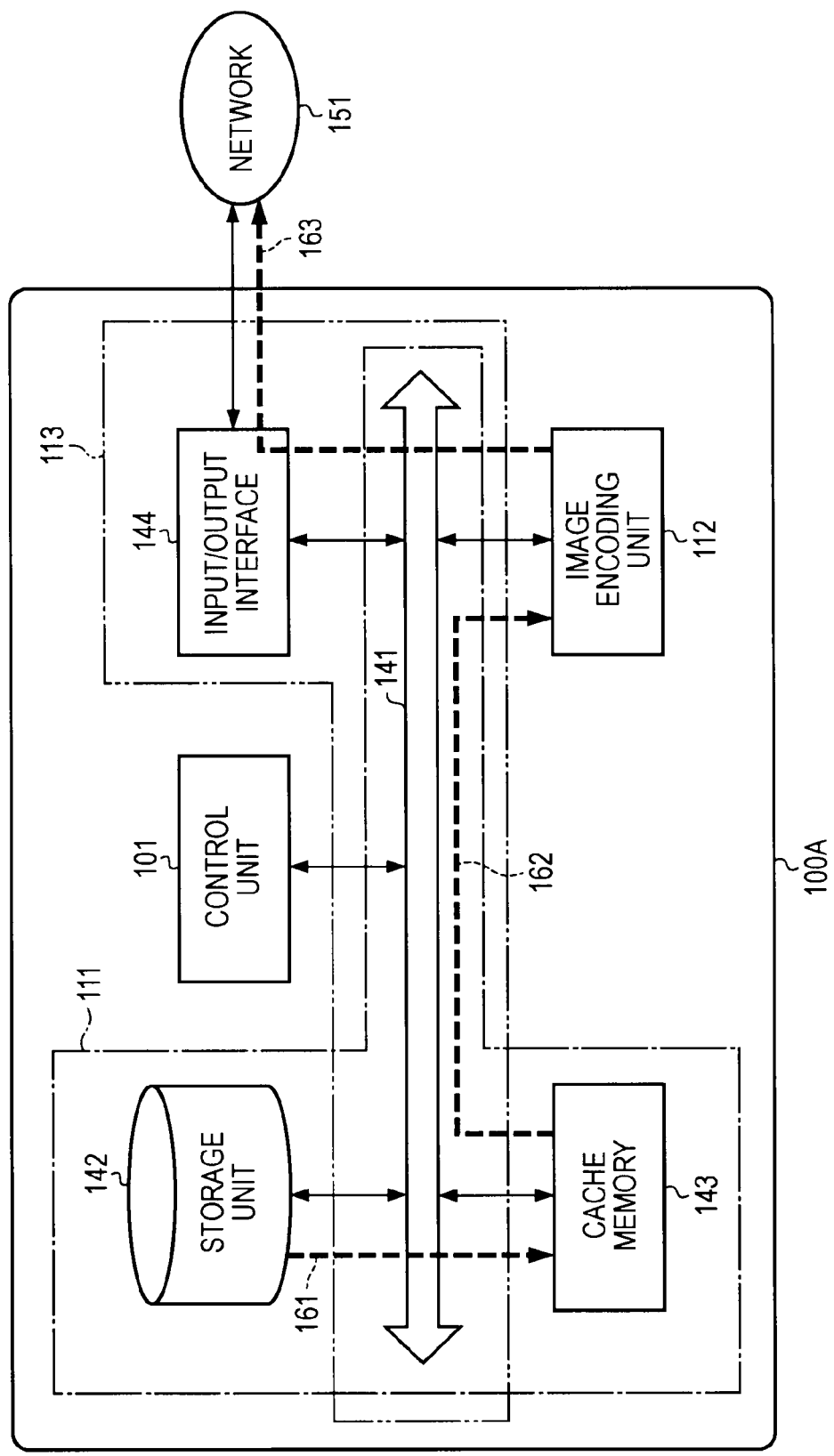
FIG. 2 is a diagram illustrating a concrete example of an encoding apparatus of FIG. 1.

FIG. 2 is a diagram illustrating a concrete example of an encoding apparatus of FIG. 1. An encoding apparatus 100A indicates a concrete example of the configuration of the encoding apparatus 100 of FIG. 1. As shown in FIG. 2, in the encoding apparatus 100A, the control unit 101 and the image encoding unit 112 are connected to a bus 141. To the bus 141, a storage unit 142, a cache memory 143, and an input/output interface 144 are further connected.

The bus 141 is a transmission medium of data that is transmitted and received between processing units connected to the bus 141. For example, the bus is configured by a PCI (Peripheral Components Interconnect) bus or the like. The storage unit 142 is a recording medium for storing the data. For example, the storage unit is configured by a hard disk, a flash memory, or the like.

The cache memory 143 is a recording medium that temporarily keeps the data. For example, the cache memory is configured by a semiconductor memory that can exchange data at high speed in comparison to the reading speed of the storage unit 142 such as RAM or the throughput of the input/output interface 144.

The input/output interface 144 performs the data exchange in the encoding apparatus 100A. The input/output interface 144, for example, acquires data supplied from an external network 151 of the encoding apparatus 100A, and supplies the data to the cache memory 143 through the bus 141. Also, the input/output interface 144 acquires data supplied from the image encoding unit 112 through the bus 141, and supplies the data to another apparatus through the network 151. For example, the input/output interface is configured by HDMI (High-Definition Multimedia Interface), HD-SDI (High Definition Serial Digital Interface), Ethernet (registered trademark) (i.e. LAN (Local Area Network) board), or the like.

In the encoding apparatus 100A as configured above, the image data to be encoded is stored in the storage unit 142. The control unit 101, as indicated by a dotted arrow 161, reads the image data from the storage unit 142, and supplies the read image data to the cache memory 143 through the bus 141 to keep the image data in the cache memory 143.

The control unit 101, as indicated by a dotted arrow 162, reads the image data kept in the cache memory 143, and supplies the read image data to the image encoding unit 112 through the bus 141 to encode the image data.

The control unit 101, as indicated by a dotted line 163, supplies a code stream obtained by encoding the image data to the input/output interface 144 through the bus 141, and the code stream is output from the input/output interface 144 to an external network 151.

That is, in the encoding apparatus 100A, as indicated by a dashed line, the input system 111 is configured by the bus 141, the storage unit 142, and the cache memory 143, and as indicated by a dashed line, the output system 113 is configured by the bus 141 and the input/output interface 144.

Generally, in the input system 111, the read rate of data from the storage unit 142 is lower than the transmission rate of the bus 141 or the data input/output rate of the cache memory 143. Accordingly, as described above with reference to FIG. 1, if the processing speed (i.e. throughput) of the image encoding process of the image encoding unit 112 is higher than the data reading speed of the storage unit 142, the control unit 101 reduces the processing speed of the image encoding process of the image encoding unit 112 to match the data reading speed of the storage unit 142 (i.e. the processing speed of the input system 111).

Generally, in the output system 113, the input/output rate (i.e. throughput) of data of the input/output interface 144 is lower than the transmission rate of the bus 141. Accordingly, as described above with reference to FIG. 1, if the processing speed (i.e. throughput) of the image encoding process of the image encoding unit 112 is higher than the input/output speed of data of the input/output interface 144, the control unit 101 reduces the processing speed of the image encoding process of the image encoding unit 112 to match the data input/output speed of the input/output interface 144 (i.e. the processing speed of the output system 113).

Also, as described above with reference to FIG. 1, if the processing speed (i.e. throughput) of the image encoding process of the image encoding unit 112 is lower than the input/output speed of data of the input/output interface 144, the control unit 101 raises the processing speed of the image encoding process of the image encoding unit 112 to match the data input/output speed of the input/output interface 144 (i.e. the processing speed of the output system 113).

As the control unit 101 controls the encoding process as described above, the encoding apparatus 100A can suppress the occurrence of unnecessary waiting time by properly controlling the processing speeds of the respective units. That is, the encoding apparatus 100A can perform the encoding by using the hardware resources more effectively.

Figure 3:
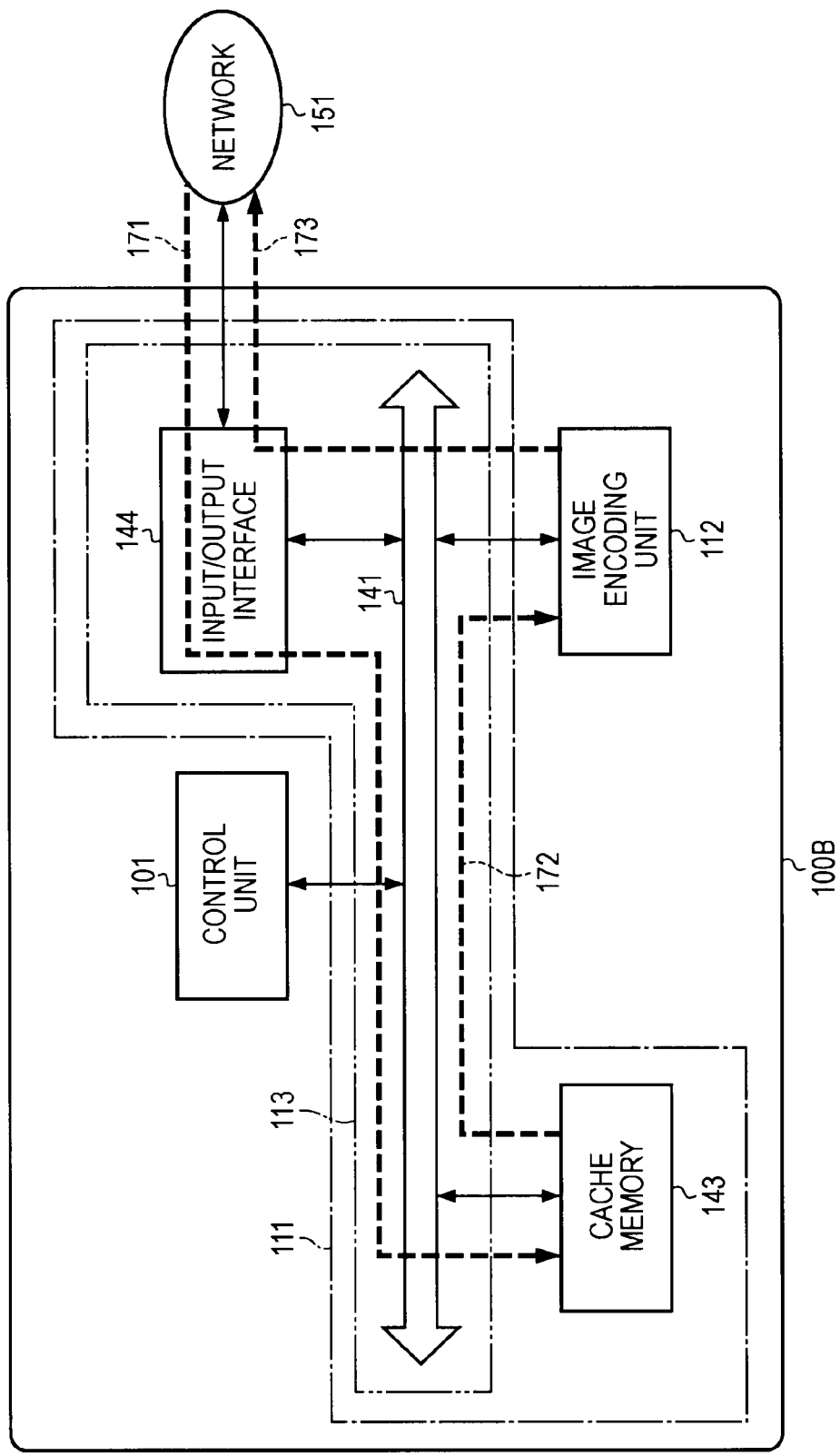
FIG. 3 is a diagram illustrating concrete example of an encoding apparatus of FIG. 1.

FIG. 3 is a diagram illustrating another concrete example of an encoding apparatus 100 of FIG. 1.

An encoding apparatus 100B indicates another concrete example of the configuration of the encoding apparatus 100 of FIG. 1. As shown in FIG. 3, in the encoding apparatus 100B, the control unit 101 and the image encoding unit 112 are connected to the bus 141. To the bus 141, the cache memory 143 and the input/output interface 144 are further connected.

In the encoding apparatus 100B as configured above, the image data to be encoded is supplied to another apparatus through the network 151. The control unit 101, as indicated by a dotted arrow 171, acquires the image data by controlling the input/output interface 144, and supplies the image data to the cache memory 143 through the bus 141 to keep the image data in the cache memory 143.

The control unit 101, as indicated by a dotted arrow 172, reads the image data kept in the cache memory 143, and supplies the read image data to the image encoding unit 112 through the bus 141 to encode the image data.

The control unit 101, as indicated by a dotted line 173, supplies a code stream obtained by encoding the image data to the input/output interface 144 through the bus 141, and the code stream is output from the input/output interface 144 to an external network 151.

That is, in the encoding apparatus 100B, as indicated by a dashed line, the input system 111 is configured by the bus 141, the cache memory 143, and the input/output interface 144, and as indicated by a dashed line, the output system 113 is configured by the bus 141 and the input/output interface 144.

Generally, in the input system 111, the input/output rate (i.e. throughput) of data of the input/output interface 144 is lower than the transmission rate of the bus 141 or the data input/output rate of the cache memory 143. Accordingly, as described above with reference to FIG. 1, if the processing speed (i.e. throughput) of the image encoding process of the image encoding unit 112 is higher than the input/output speed of data of the input/output interface 144, the control unit 101 reduces the processing speed of the image encoding process of the image encoding unit 112 to match the data input/output speed of the input/output interface 144 (i.e. the processing speed of the input system 111).

Also, in the same manner as the case in FIG. 2, if the processing speed (i.e. throughput) of the image encoding process of the image encoding unit 112 is higher than the input/output speed of data of the input/output interface 144, the control unit 101 reduces the processing speed of the image encoding process of the image encoding unit 112 to match the data input/output speed of the input/output interface 144 (i.e. the processing speed of the output system 113).

Further, in the same manner as the case in FIG. 2, if the processing speed (i.e. throughput) of the image encoding process of the image encoding unit 112 is lower than the input/output speed of data of the input/output interface 144, the control unit 101 raises the processing speed of the image encoding process of the image encoding unit 112 to match the data input/output speed of the input/output interface 144 (i.e. the processing speed of the output system 113).

As the control unit 101 controls the encoding process as described above, the encoding apparatus 100B can suppress the occurrence of unnecessary waiting time by properly controlling the processing speeds of the respective units. That is, the encoding apparatus 100B can perform the encoding by using the hardware resources more effectively.

Figure 4:
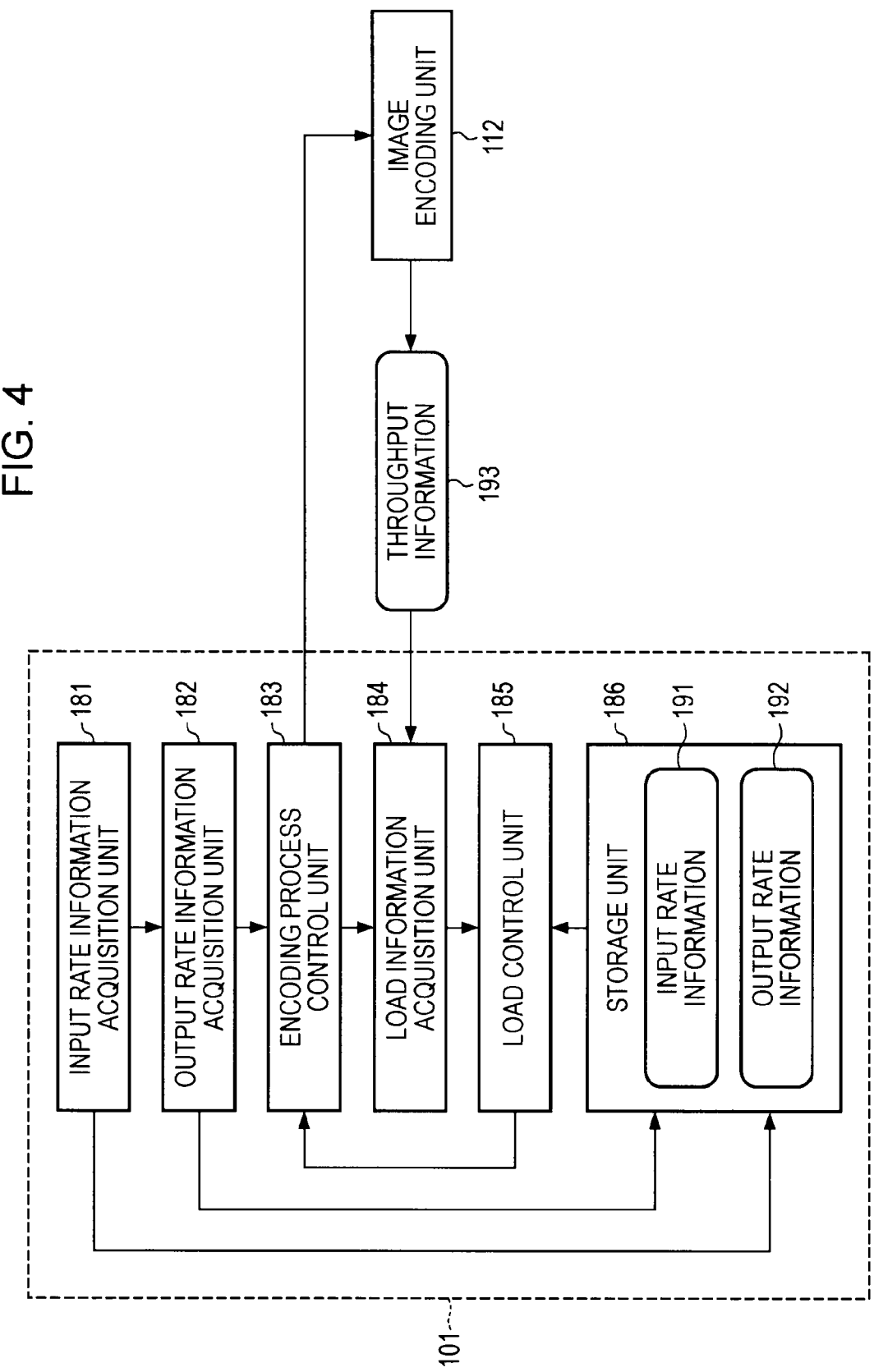
FIG. 4 is a block diagram illustrating a main configuration example of a control unit.

Then, the control unit 101 that performs the above-described control will be described. FIG. 4 is a block diagram illustrating a main configuration example of a control unit. As shown in FIG. 4, the control unit 101 includes an input rate information acquisition unit 181, an output rate information acquisition unit 182, an encoding process control unit 183, a load information acquisition unit, a load control unit 185, and a storage unit 186.

The input rate information acquisition unit 181 acquires input rate information 191 that indicates the throughput of the input system 111 from a device constituting the input system 111, and stores the acquired input rate information in the storage unit 186. The output rate information acquisition unit 182 acquires output rate information 192 that indicates the throughput of the output system 113 from a device constituting the output system 113, and stores the acquired output rate information in the storage unit 186.

The input rate information 191 and the output rate information 192 may be values measured in the input system 111 or the output system 113, or the specification of the device constituting the input system 111 or the output system 113. Accordingly, if the devices constituting the input system 111 and the output system 113 are pre-determined and their device specifications are determined as the input rate information 191 and the output rate information 192, the input rate information 191 and the output rate information 192, for example, may be pre-stored in the storage unit 186 when the product is shipped in the factory. In this case, the input rate information acquisition unit 181 and the output rate information acquisition unit 182 may be omitted.

The encoding process control unit 183 controls the encoding process of the image data performed by the image encoding unit 112. The encoding process control unit 183 controls the throughput of the encoding processing so as to reach the load amount determined by the load control unit 185.

The load information acquisition unit 184 acquires the load information that indicates the predicted value of the load size (i.e. load amount) of the image encoding process of the image encoding unit 112. For example, the load information acquisition unit 184 acquires throughput information 193 that directly or indirectly indicates the predicted value of the throughput of the image encoding processing as the load information. The contents of the throughput information 193 are optional, and are configured, for example, by information that indicates the degree of difficulty in encoding the image data, throughput of the past encoding processing per unit time, and the like. The load information acquisition unit 184 supplies the acquired load information to the load control unit 185.

The load control unit 185 reads the input rate information 191 and the output rate information 192 from the storage unit 186, and determines the load amount of the image encoding processing performed by the image encoding unit 112 on the basis of the load information (i.e. throughput information 193) supplied from the load information acquisition unit 184. The load control unit 185 controls the throughput of the image encoding process so that it reaches the determined load amount by controlling the encoding process control unit 183.

The storage unit 186 is, for example, a storage medium configured by a semiconductor memory such as RAM, and stores information such as the input rate information 191 or the output rate information 192.

[Flow of Processing]

Next, a flow of various kinds of processes performed by the encoding apparatus 100 will be described. First, an example of a flow of the encoding control process performed by the control unit 101 will be described with reference to a flowchart of FIG. 5.

If the encoding process control starts, the input rate information acquisition unit 181 of the control unit 101 acquires the input rate information in step S101. In step S102, the output rate information acquisition unit 182 acquires the output rate information. In step S103, the encoding process control unit 183 reads the image data from the input system 111 (e.g. the cache memory 143), and inputs the read image data to the image encoding unit 112.

In step S104, the encoding process control unit 183 controls the image encoding unit 112 to perform the image encoding process for encoding the input image data. In step S105, the load information acquisition unit 184 acquires the throughput information 193 for the encoding process.

In step S106, the load control unit 185 controls the throughput of the image encoding process that is performed by the control in step S104 on the basis of at least either of the input rate and the output rate.

In step S107, the encoding process control unit 183 outputs the code stream generated by the image encoding process to the output system 113 to process the code stream.

In step S108, the encoding process control unit 183 determines whether to end the encoding control process. For example, if it is determined that unprocessed image data exists in the input system 111 (e.g. the cache memory 143) and thus the encoding control process is not ended, the processing returns to step S101 and repeats the subsequent processing.

In this case, if the input rate is a fixed value, the processing in step S101 can be omitted. In the same manner, if the output rate is a fixed value, the processing in step S102 can be omitted.

In step S108, if it is determined that, for example, unprocessed image data does not exist in the input system 111 (e.g. the cache memory 143) and thus the encoding control process is ended, the encoding control process is ended.

Also, the processing in step S105 (i.e. the acquisition of the throughput information) is performed on the proper timing in accordance with the contents of the information. Accordingly, for example, it is possible that the processing in step S105 and the processing in step S106 are performed prior to the processing in step S104. Also, for example, it is also possible that during the performing of the image encoding process, the processing in step S105 and the processing in step S106 are performed.

Next, an example of a detailed flow of the load control process that is performed in step S106 of FIG. 5 will be described with reference to a flowchart of FIG. 6.

If a load control process starts, the load control unit 185 determines whether the throughput of the encoding processing is higher than the input rate on the basis of the input rate information 191 and the throughput information 193 in step S121.

If it is determined that the throughput of the encoding process is higher than the input rate, the processing goes to step S122. In this case, the processing speed of the image encoding process is so high that the supply of the image data from the input system 111 is unable to follow the processing speed. That is, the image encoding process unnecessarily consumes the hardware resources. Accordingly, the load control unit 185 reduces the processing speed of the image encoding process of the image encoding unit 112 in step S122, and lowers the throughput of the image encoding process to the level of the input rate. If the processing in step S122 is ended, the processing returns to step S106 of FIG. 5, and the subsequent processing is preformed.

If it is determined that the throughput of the encoding process is not higher than the input rate, the processing goes to step S123. The load control unit 185 determines whether the throughput of the encoding process is higher than the output rate on the basis of the output rate information 192 and the throughput information 193 in step S123.

If it is determined that the throughput of the encoding process is higher than the output rate, the processing goes to step S124. In this case, the processing speed of the image encoding process is so high that the processing in the output system 113 may overflow. That is, the image encoding process unnecessarily consumes the hardware resources. Accordingly, the load control unit 185 reduces the processing speed of the image encoding process of the image encoding unit 112 in step S124, and lowers the throughput of the image encoding process to the level of the output rate. If the processing in step S124 is ended, the processing returns to step S106 of FIG. 5, and the subsequent processing is preformed.

If it is determined that the throughput of the encoding process is not higher than the output rate, the processing goes to step S125. The load control unit 185 determines whether the throughput of the encoding process is lower than the output rate on the basis of the output rate information 192 and the throughput information 193 in step S125.

If it is determined that the throughput of the encoding process is lower than the output rate, the processing goes to step S126. In this case, the processing speed of the image encoding process is too low, and thus unnecessary vacant time (i.e. waiting time) occurs in the processing in the output system 113. That is, the consumption of hardware resources in the image encoding process becomes too small. If there are enough hardware resources, the throughput of the encoding apparatus 100 can be improved by making the image encoding process further consume the hardware resources. Accordingly, in step S126, the load control unit 185 raises the throughput of the image encoding process up to the output rate by raising the processing speed of the image encoding processing of the image encoding unit 112. If the processing in step S126 is ended, the processing returns to step S106 in FIG. 5, and the subsequent processing is performed.

Figure 5:
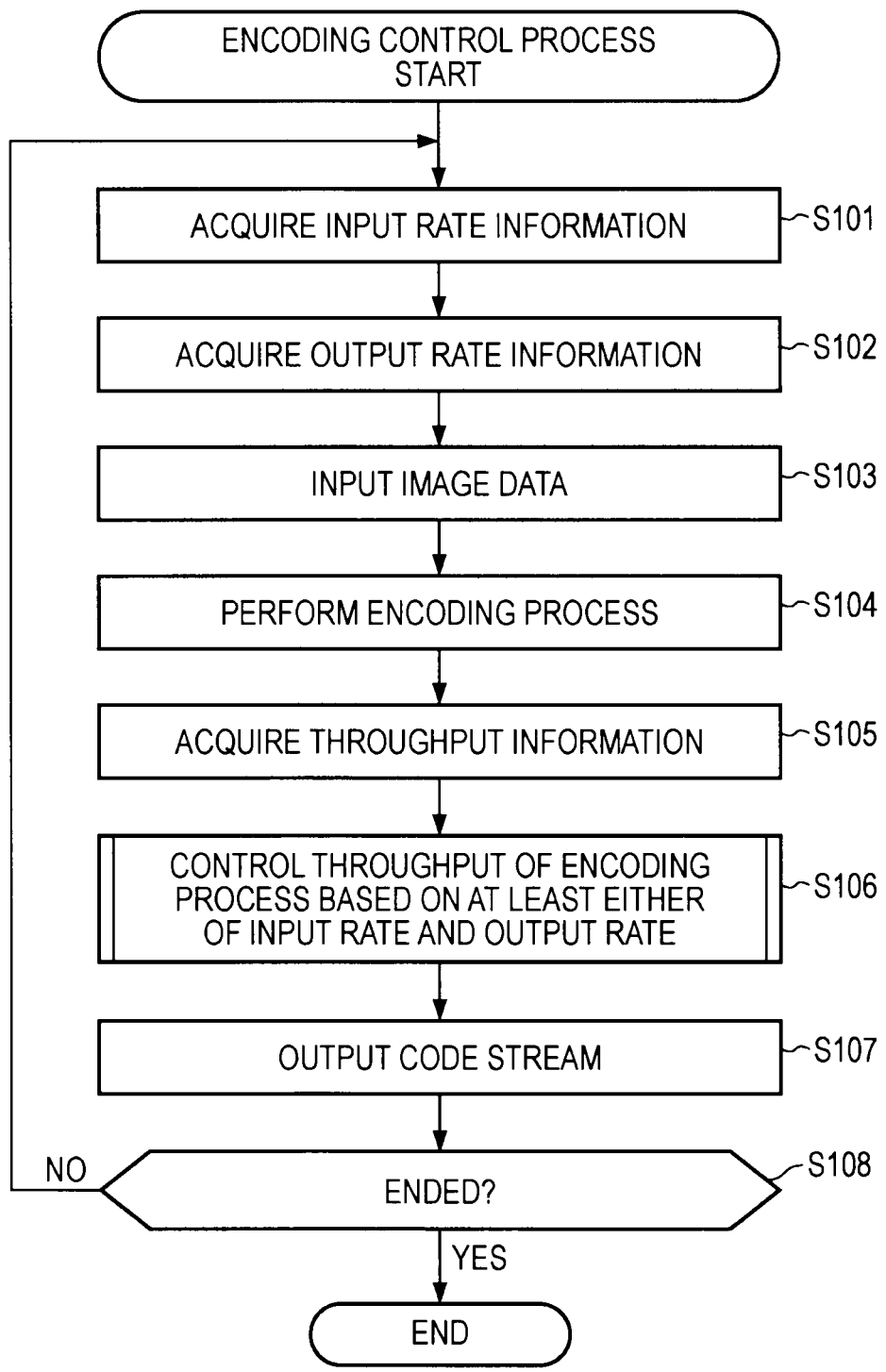
FIG. 5 is a flowchart illustrating an example of a flow of encoding control processing.

If it is determined that the throughput of the encoding process is not lower than the output rate, the load control process is ended, the processing returns to step S106 in FIG. 5, and then the subsequent processing is performed.

As the above-described control process is performed, the encoding apparatus 100 can utilize the hardware resources more effectively in the encoding process.

Figure 6:
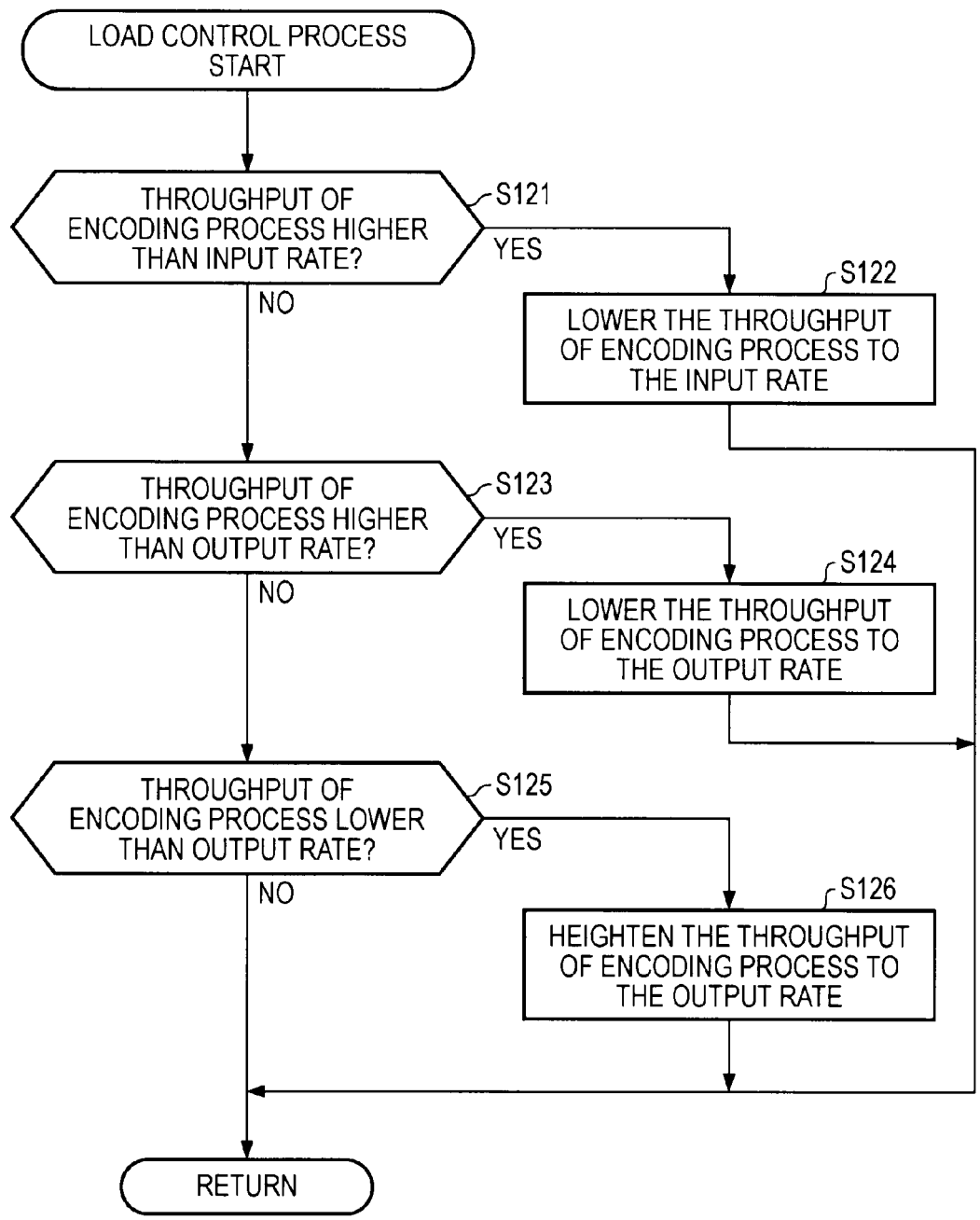
FIG. 6 is a flowchart illustrating an example of a flow of load control processing.

In FIG. 6, it is described that the determination processes in steps S121, S123, and S125 are performed in the order of the flowchart as illustrated in FIG. 6. However, the priority of determination conditions is optional, and the determination processes can be performed in any selected order. Also, the control of the throughput of the encoding processing (e.g.

steps S122, S124, and S126) may be performed when a plurality of determination conditions are satisfied.

2. Second Embodiment

Configuration of an Image Encoding Unit

The encoding method of the image encoding unit 112 is optional, and may be JPEG (Joint Photographic Experts Group), MPEG (Moving Picture Experts Group), AVC (Advanced Video Coding), JPEG-LS (Lossless JPEG), JPEG2000 Lossless, or another method.

Figure 7:
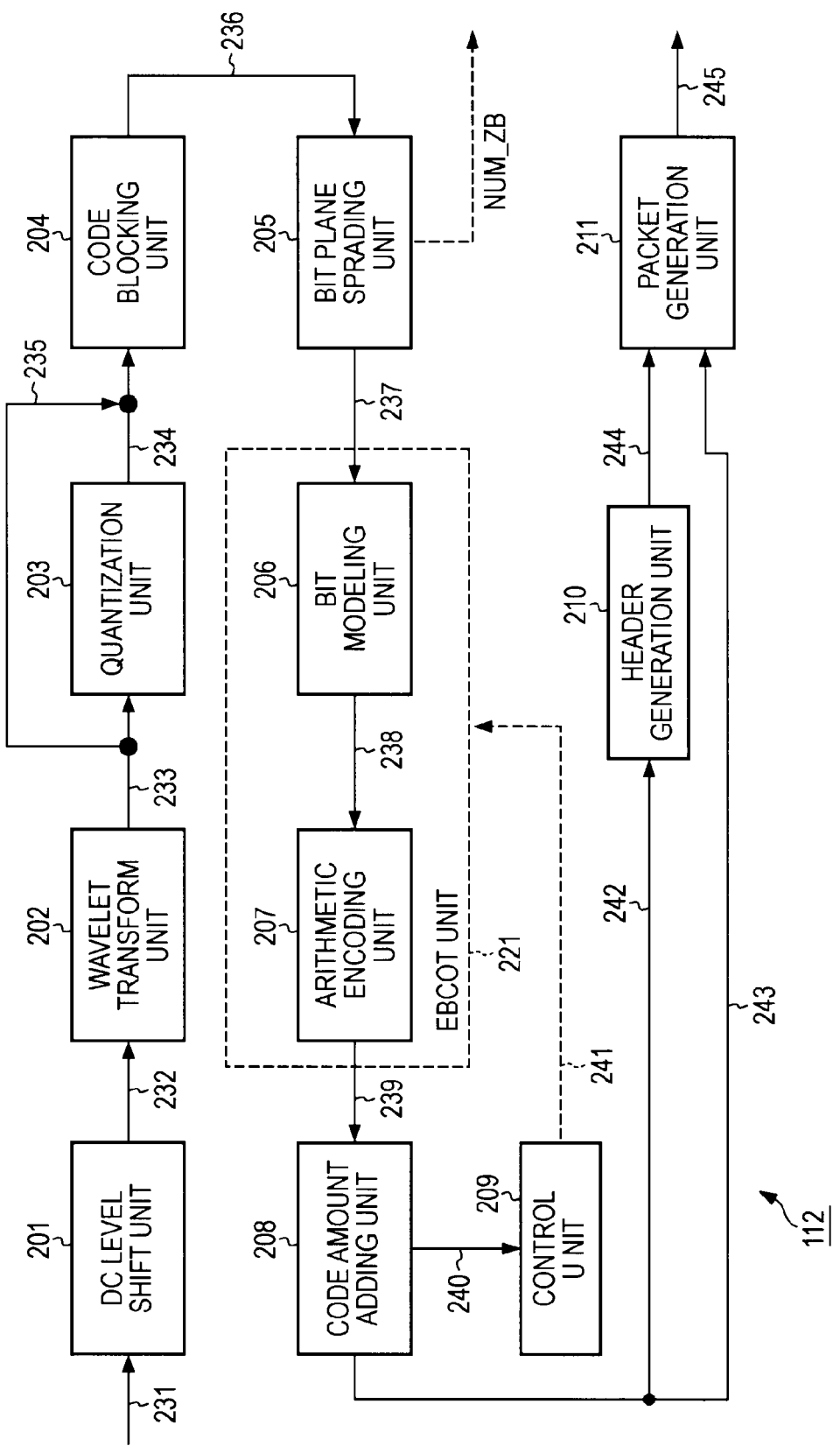
FIG. 7 is a block diagram illustrating a main configuration example of an image encoding unit.

Hereinafter, a case in which JPEG2000 is adopted as the encoding method will be described. FIG. 7 is a block diagram illustrating a main configuration example of an image encoding unit 112. As illustrated in FIG. 7, the image encoding unit 112 includes a DC level shift unit 201, a wavelet transform unit 202, a quantization unit 203, a code blocking unit 204, and a bit plane spreading unit 205.

The DC level shift unit 201, in order to effectively perform the following wavelet transform, performs level shift of a DC component of image data input to the image encoding unit 112 as indicated by an arrow 231. For example, RGB signal has a positive value (i.e. an integer having no sign). Accordingly, the DC level shift unit 201 performs the level shift with a half of a dynamic range of the original signal to seek the improvement of the compression efficiency. Accordingly, if a signal having an integer value with a sign (positive and/or negative), such as Cb or Cr (chrominance signal) of YCbCr signal, is used as the original signal, this level shift is not performed.

The wavelet transform unit 202 is implemented by a filter bank composed of a low-pass filter and a high-pass filter. Also, since a digital filter has an impulse response (i.e. filter coefficient) having a length corresponding to a plurality of taps, the wavelet transform unit 122 has a buffer for pre-buffering the input image to the extent that the filtering can be performed.

If more than a minimum amount of image data, which is necessary for the filtering, the wavelet transform unit 202 is acquired from the DC level shift unit 201 as shown by an arrow 232, generates wavelet coefficients by filtering the image data after the DC level shifting using predetermined wavelet transform filters. Also, the wavelet transform unit 202 performs filtering for dividing the image data into a low-band component and a high-band component in vertical and horizontal directions of the image.

Figure 8:
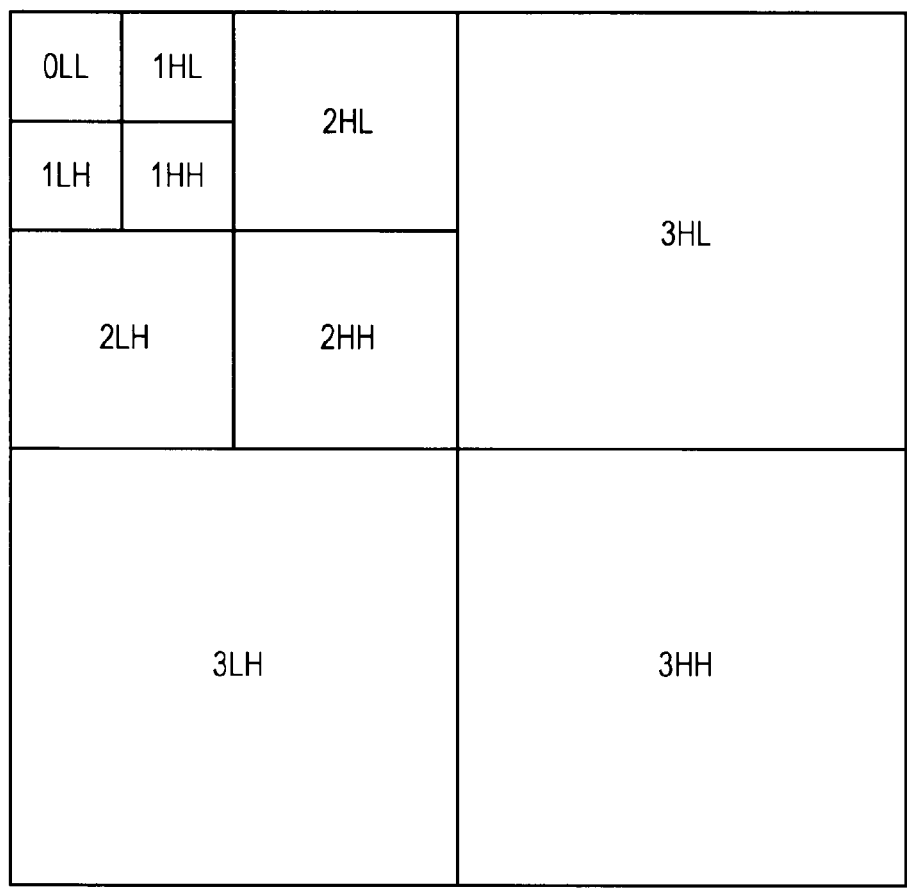
FIG. 8 is a diagram illustrating an example of sub-bands.

As shown in FIG. 8, the wavelet transform unit 202 reflexively repeats the filtering for a predetermined number of times with respect to sub-bands separated as low-band components in both vertical and horizontal directions. This is because most energy of the image is concentrated on the low-band components.

FIG. 8 is a diagram illustrating a configuration example of sub-bands generated by the wavelet transform process with three divided levels. In this case, the wavelet transform unit 202 generates sub-bands 3LL (not illustrated), 3HL, 3LH, and 3HH by filtering the whole image. Then, the wavelet transform unit 202 performs the filtering again with respect to the generated sub-band 3LL to generate 2LL (not illustrated), 2HL, 2LH, and 2HH. In addition, the wavelet transform unit 122 performs the filtering again with respect to the generated sub-band 2LL to generate 0LL, 1HL, 1LH, and 1HH.

The wavelet transform unit 202 supplies the wavelet coefficients obtained by the filtering to the quantization unit 203 for each sub-band as indicated by an arrow 233. The quantization unit 203 quantizes the supplied wavelet coefficients.

Although the quantization method is optional, a scalar quantization for performing dividing in quantization step size is general. The quantization unit 203 supplies the quantization coefficients obtained by the quantization to the code blocking unit 204 as indicated by an arrow 234. In this case, although the quantization coefficients are supplied to the following function unit instead of the wavelet coefficients, the quantization coefficients are handled basically in the same manner as the wavelet coefficients. Accordingly, hereinafter, the description of the point will be omitted unless necessary, and the wavelet coefficients or quantization coefficients are simply called coefficients or coefficient data.

If the image encoding unit 112 encodes the image data in a reversible encoding method that can completely restore the original data through the decoding, the processing of the quantization unit 203 is omitted, and as indicated by an arrow 235, the output of the wavelet transform unit 202 is supplied to the code blocking unit 204.

Figure 9:
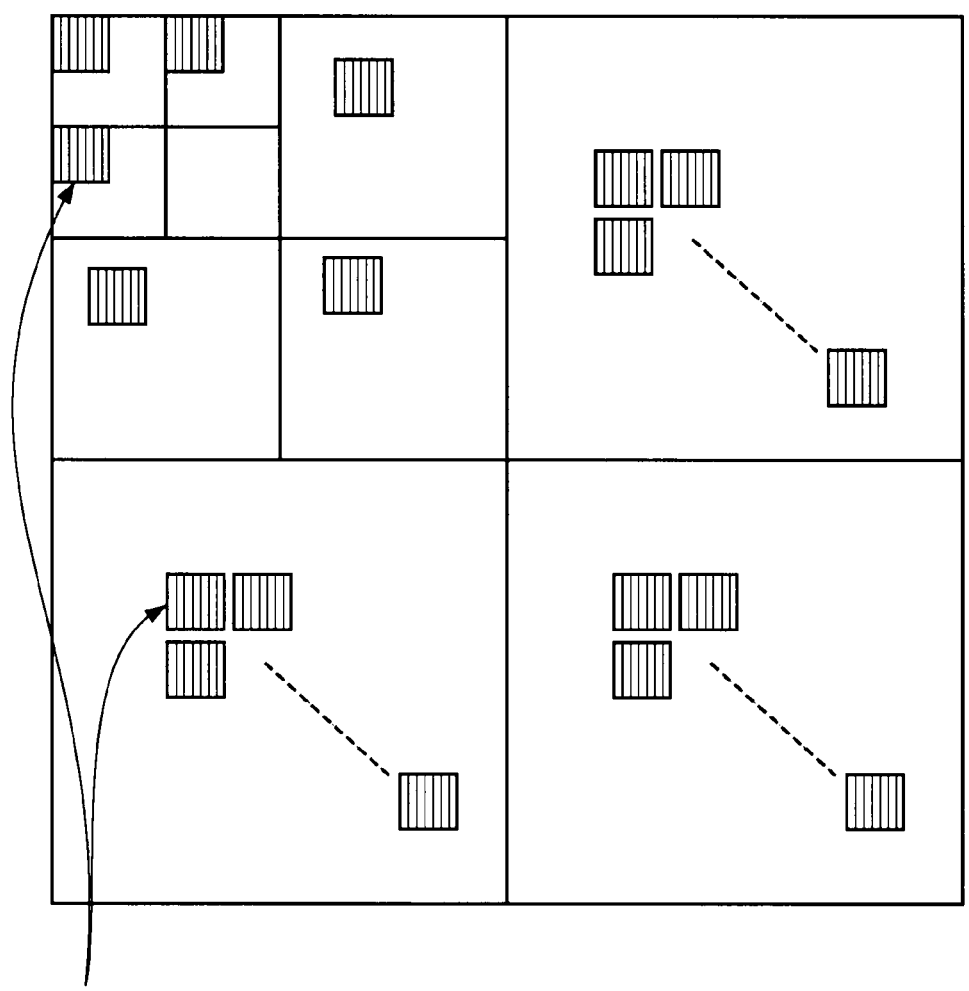
FIG. 9 is a diagram illustrating an example of code blocks.

The wavelet coefficients are divided into code blocks of a predetermined size that is the processing unit of entropy encoding in the code blocking unit 204. FIG. 9 shows the position relations between code blocks among the respective sub-bands. For example, code blocks having a size of about 64×64 pixels are generated among all the sub-bands after the division. In an example of FIG. 4, if it is assumed that the size of the sub-band of 3HH having the smallest divided level is, for example, 640×320, total 50 code blocks of 64×64 pixels exist. The respective following processing units perform the processing for the respective code blocks.

The code blocking unit 204, as indicated by an arrow 236, supplies the respective code blocks to the bit plane spreading unit 205. The bit plane spreading unit 205 spreads the coefficient data on the bit planes for the respective bit positions.

The bit planes are obtained by dividing (i.e. slicing) the coefficient group composed of a predetermined number of wavelet coefficients for one bit, i.e. for each bit position. That is, the bit planes are a set of bits (i.e. coefficient bits) of the same positions of the coefficient group.

Figure 10:
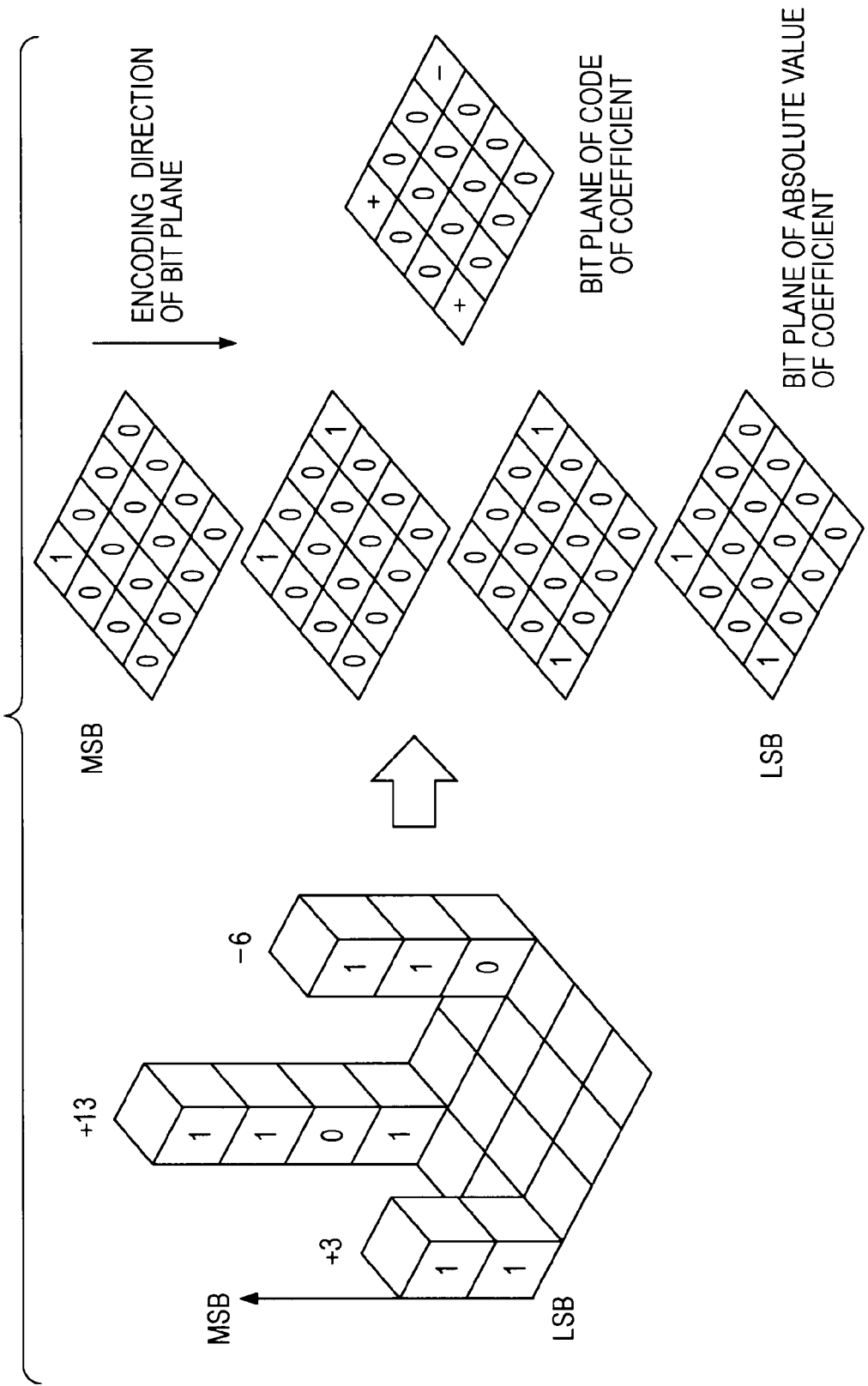
FIG. 10 is a diagram illustrating an example of bit planes.

FIG. 10 shows a concrete example of the bit planes. The left-side drawing in FIG. 10 shows 16 (=4×4 in length and in width) coefficients in total. Among 16 coefficients, the one having the maximum absolute value is 13, which is expressed as 110 in binary. The bit plane spreading unit 205 spreads the coefficient group on the four sheets of bit plane that indicates an absolute value (i.e. bit plane of an absolute value) and one sheet of bit plane that indicates sign (i.e. bit plane of a sign). That is, the coefficient group on the left side of FIG. 10, as illustrated in right side of FIG. 10, is spread on the four sheets of absolute bit planes and one sheet of sign bit plane. Here, all elements of the absolute bit planes take a value of "0" or "1". Also, the element of the bit plane indicating the sign takes one of a value indicating that the coefficient value is positive, a value indicating that the coefficient value is "0", and a value indicating that the coefficient value is minus.

The image encoding unit 112 further includes a bit modeling unit 206, an arithmetic encoding unit 207, a code amount adding unit 208, a control unit 209, a header generation unit 210, and a packet generation unit 211.

The bit plane spreading unit 205 supplies the spread bit planes to the bit modeling unit 206 as indicated by an arrow 237.

The bit modeling unit 206 and the arithmetic encoding unit 207 operate as an EBCOT (Embedded Coding with Optimized Truncation) unit 221, and perform an entropy encoding that is called EBCOT determined in the JPEG2000 standard.

EBCOT is a technique that performs the encoding as measuring the statistical amount of the coefficients in each block of a predetermined size.

The bit modeling unit 206 performs the bit modeling of the coefficient data in the order determined in the JPEG2000 standard, and outputs context to the arithmetic encoding unit as indicated by an arrow 238. The arithmetic encoding unit 207 performs arithmetic encoding of the bit planes of the coefficients.

The size of the code block in length and width is two square in the range of 4 to 256, and the typically used size is 32×32, 64×64, 128×32, or the like. Thee coefficient value is expressed as a binary number having n-bit sign, and bit 0 to bit (n−2) indicate respective bits from LSB to MSB. The remaining one bit indicates the sign. The blocking of the sign block is performed in order from the MSB-side bit plane, for example, by three kinds of encoding paths of a significant propagation pass, a magnitude refinement pass, and a cleanup pass.

The arithmetic encoding unit 207 supplies the generated code stream to the code amount adding unit 208 as indicated by an arrow 239. The code amount adding unit 208 counts and accumulates the code amount of the code stream. Also, the code amount adding unit 208 supplies the code stream to the header generation unit 210 and the packet generation unit 211 as indicated by arrows 242 and 243, and supplies the accumulated value of the code amount to the control unit 209 as indicated by an arrow 240. The control unit 209 compares the accumulated value of the code amount with a target code amount, and if the accumulated value is smaller than the target code amount, the control unit 209 controls the EBCOT unit 221 to perform the next bit plane encoding as indicated by an arrow 241. The EBCOT unit 221, under the control of the control unit 209, encodes the next important bit plane, and supplies the generated code stream to the code amount adding unit 208. The code amount adding unit 208 counts and accumulates the code amount of the code stream, and supplies the accumulated value to the control unit 209.

Until the accumulated value reaches the target code amount, the above-described process is repeated. If the accumulated value reaches the target code amount, the control unit 209 controls the EBCOT unit 221 to end the encoding.

The packet generation unit 211 packetizes the supplied encoded code stream. The header generation unit 210 generates the head information of the packet, and supplies the header information to the packet generation unit 211 as indicated by an arrow 244. The packet generation unit 211 performs the packetizing using the header information. The generated packet is output to the outside of the image encoding unit 112 as indicated by an arrow 245.

[Configuration of a Control Unit]

Figure 11:
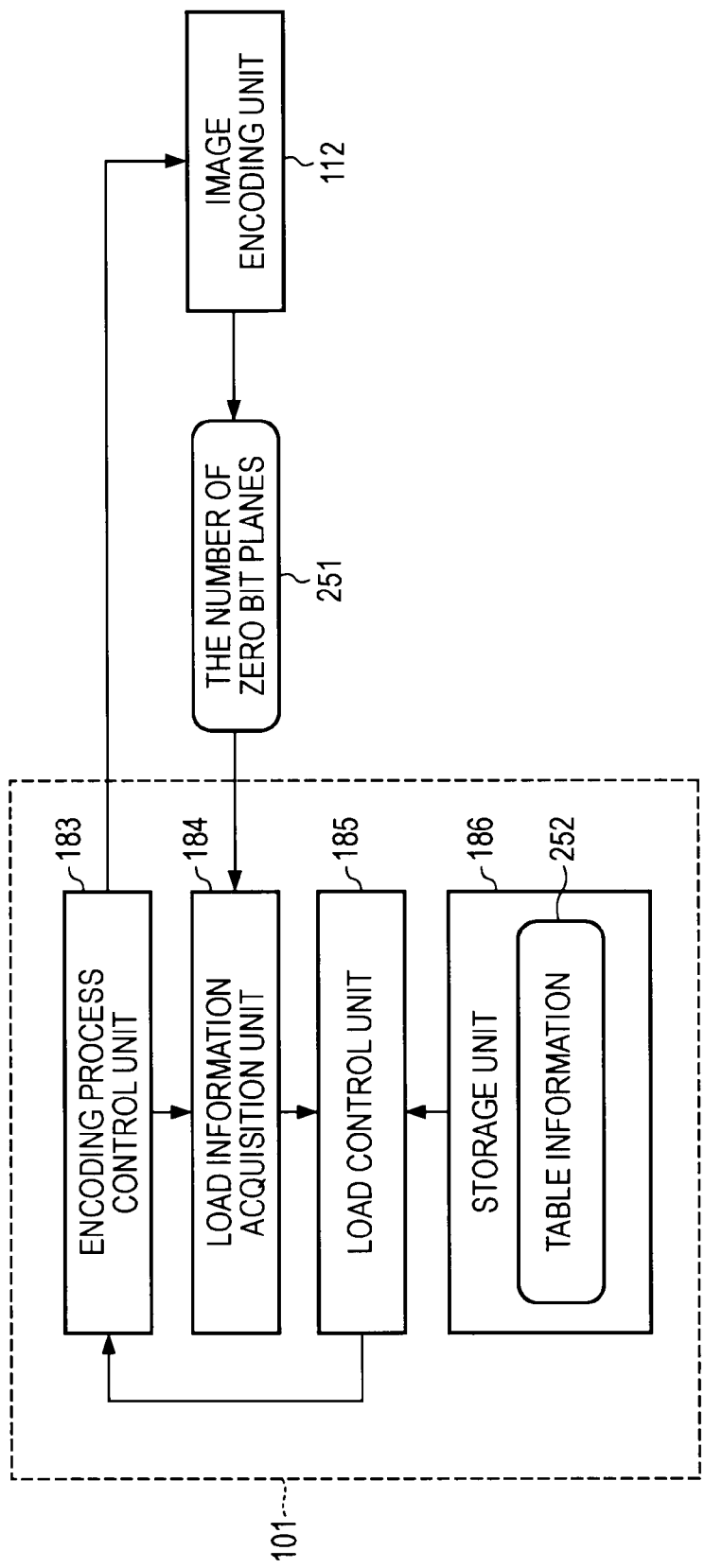
FIG. 11 is a block diagram illustrating a main configuration example of a control unit.

Next, a control unit for controlling the image encoding unit 112 will be described. FIG. 11 is a block diagram illustrating a main configuration example of a control unit. In FIG. 11, the control unit 101 basically has the same configuration as the described with reference to FIG. 4. That is, the control unit 101 has the encoding process control unit 183, the storage unit 186, and the like.

In this case, however, the load information acquisition unit 184 of the control unit 101 acquires the number of zero-bit planes 251 from the image encoding unit 112 as the load information.

The zero-bit planes indicate the bit planes of which the coefficients are all zero and which continue from MSB among the respective bit planes spread by the bit plane spreading unit 205. That is, the number of zero-bit planes indicates the continuous numbers from the MSB of the bit planes of which all coefficients are zero. These values are determined at the time when the bit plane spreading unit 205 spreads the code block on the bit planes. The load information acquisition unit 184 acquires the number of zero-bit planes 251 generated as above from the bit plane spreading unit 205 of the image encoding unit 112.

Figures 12, 13:
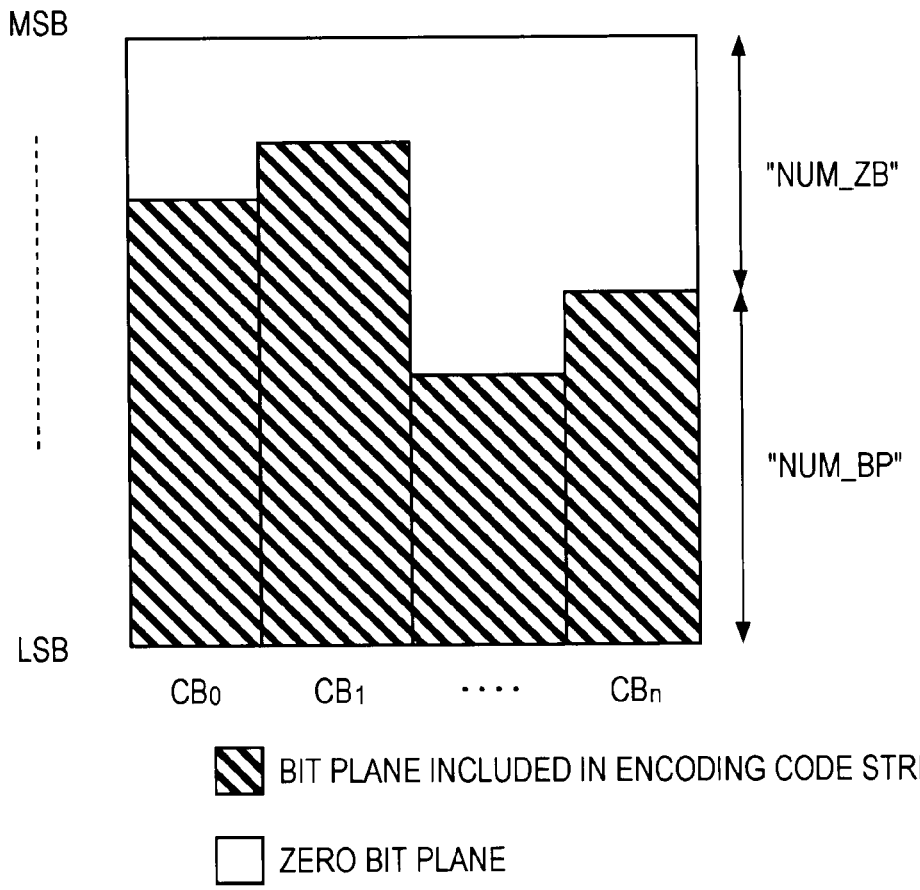
FIG. 12 is a diagram illustrating an example of zero-bit planes.
FIG. 13 is a diagram illustrating an example of table information for obtaining a correction amount of a processing speed from the number of effective bit planes.

FIG. 12 is a diagram illustrating an example of zero-bit planes. As shown in FIG. 12, the number of zero-bit planes 251 is calculated for each code block. By subtracting the number of zero-bit planes NUM_ZB (e.g. blank portion in FIG. 12) from the bit depth H of the respective code blocks, the number of effective bit planes NUM_BP (e.g. slanted portion in FIG. 12) of the respective code blocks are calculated. The number of effective bit planes indicates the brief information amount of the respective code blocks. That is, it indicates the degree of difficulty of brief encoding of the respective code blocks.

In the storage unit 186, table information 252 is stored instead of the input rate information 191 or the output rate information 192. Table information 252 is table information for determining the control amount of the processing speed of the image encoding from the total sum ALL_NUM_BP of the number of effective bit planes in the picture. In the table information 252, the corresponding relations between the total sum of the number of effective bit planes in each picture and the control amount of the processing speed of the image encoding are prepared in consideration of the input rate and the output rate.

FIG. 13 is a diagram illustrating an example of table information for obtaining the correction amount of a processing speed from the number of effective bit planes.

As shown in FIG. 13, in the table information 252, the values that can be taken in the total sum ALL_NUM_BP of the number of effective bit plane are divided into a plurality of ranges, and the correction amount of the processing speed of the image encoding is allocated to each region. For example, in the case of an example of FIG. 13, when the total sum ALL_NUM_BP of the number of effective bit planes is in the range of 501 to 1000, it is considered that the processing speed has the standard value, and it is determined not to change the processing speed of the image encoding (×1.0). Also, if the total sum ALL_NUM_BP of the number of effective bit planes is larger than the value in the range, the processing speed is raised according to the value, while if the total sum ALL_NUM_BP of the number of effective bit planes is larger than the value in the range, the processing speed is reduced according to the value.

That is, the load control unit 185 obtains the number of effective bit planes from the number of zero-bit planes 251 for each code block acquired by the load information acquisition unit 184, and further obtains the total sum of the number of effective bit planes for each picture. The load control unit 185 obtains the control amount of the processing speed of the image encoding that corresponds to the total sum of the number of effective bit planes using the table information 252 read from the storage unit 186, and controls the encoding process control unit 183. By doing this, the load control unit 185 controls the load amount of image encoding on the basis of the input rate, the output rate, and the load information.

Accordingly, as described above, the encoding apparatus 100 can use the hardware resources more effectively in the encoding operation.

In this case, the input rate information acquisition unit 181 and the output rate information acquisition unit 182 of FIG. 4 are omitted.

[Flow of Processing]

Figure 14:
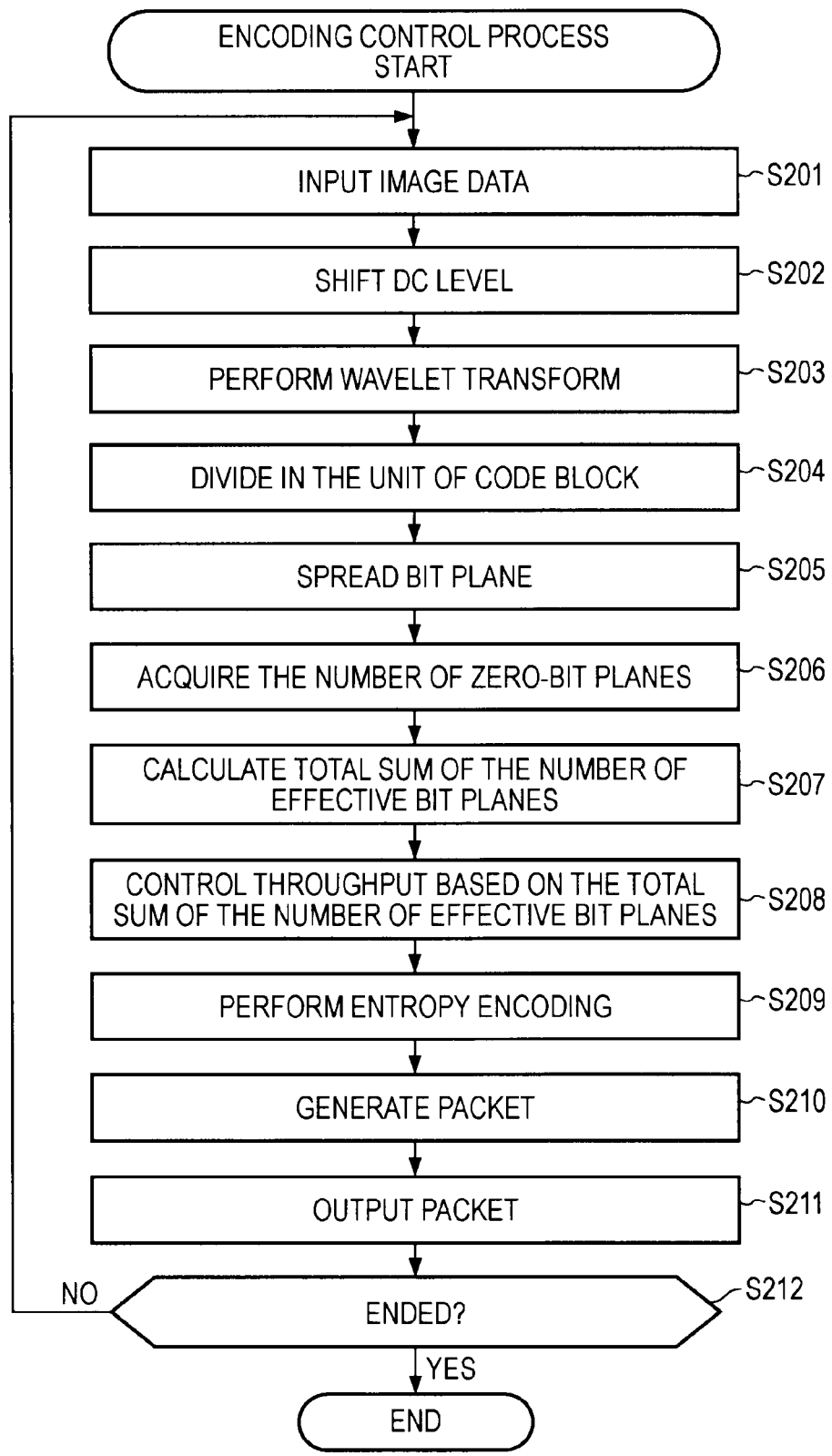
FIG. 14 is a flowchart illustrating an example of a flow of encoding control processing.

Next, an example of a flow of the encoding control process will be described with reference to a flowchart of FIG. 14.

If the encoding process control starts, the encoding process control unit 183 inputs the image data from the input system 111 (e.g. the cache memory 143) to the image encoding unit 112 in step S201.

In step S202, the encoding process control unit 183 makes the DC level shift unit 201 shift the DC level. In step S203, the encoding process control unit 183 makes the wavelet transform unit 202 perform wavelet transform. Also, in the case of a non-reversible encoding method, the encoding process control unit 183 makes the quantization unit 203 quantize the wavelet coefficients. In step S204, the encoding process control unit 183 makes the code blocking unit 204 divide the coefficients in the unit of a code block. In step S205, the encoding process control unit 183 makes the bit plane spreading unit 205 spread the coefficients on the bit planes for each code block.

In step S206, the load information acquisition unit 184 acquires the number of zero-bit planes 251 of the respective code blocks from the bit plane spreading unit 205. In step S207, the load control unit 185 calculates the total sum of the number of effective bit planes for each picture from the number of zero-bit planes 251. In step S208, the load control unit 185 controls the throughput of the image encoding based on the total sum ALL_NUM_BP of the number of effective bit planes for each picture with reference to the table information 252.

In step S209, the encoding process control unit 183 controls the EBCOT unit 221 to perform entropy encoding at the throughput determined by the load control unit 185.

The encoding process control unit 183 controls the header generation unit 210 and the packet generation unit 211 to generate packets in step S210, and to output the packets to the output system 113 in step S211, respectively.

In step S212, the encoding process control unit 183 determines whether to end the encoding control processing. If it is determined not to end the encoding control processing, the processing returns to the step S201 to repeat the subsequent processes. Also, in step S212, if it is determined to end the encoding control processing, the encoding control processing is ended.

As the control is performed as described above, the encoding apparatus 100 can use the hardware resources more effectively in the encoding process.

In this case, in the image encoding unit 112 of FIG. 7, the load of the processing of the EBCOT unit 221 is very large, while the load of the respective processing of the DC level shifting unit 201 to the bit plane spreading unit 205 is relatively small. Accordingly, in the bit plane spreading, by obtaining the throughput of the image encoding from the number of effective bit planes, the control unit 101 can control the image encoding at higher speed, and thus the increase of the delay time can be suppressed.

Particularly, in the case of the reversible encoding, in comparison to the non-reversible encoding, the increase/decrease of the load of the encoding processing according to the degree of difficulty in encoding the image data becomes great. Accordingly, the hardware resources may be unnecessarily consumed. However, since the control unit 101 performs the control as described above, the load amount of the image encoding can be controlled in the unit of a picture. Thus, even in the case of the reversible encoding, the hardware resources can be used more effectively.

As described above, the method of controlling the throughput of the image encoding is optional. For example, the clock speed of the image encoding may be changed, the time allocated to the performing of the image encoding may be increased or decreased, or the encoding method may be changed.

Also, for example, the image encoding performed by the image encoding unit 112 may be implemented by software, and in this case, the control unit 101 may control the throughput of the image encoding by increasing or decreasing the amount of hardware resource allocated to the image encoding. For example, in the case of performing the image encoding using a plurality of CPUs, a CPU (Central Processing Unit) having a plurality of cores, or a CPU corresponding to multi-thread, the control unit 101 may control the throughput of the image processing by increasing or decreasing the number of CPUs, the number of cores, or the number of threads.

3. Third Embodiment

Configuration of Hardware Resources

Figure 15:
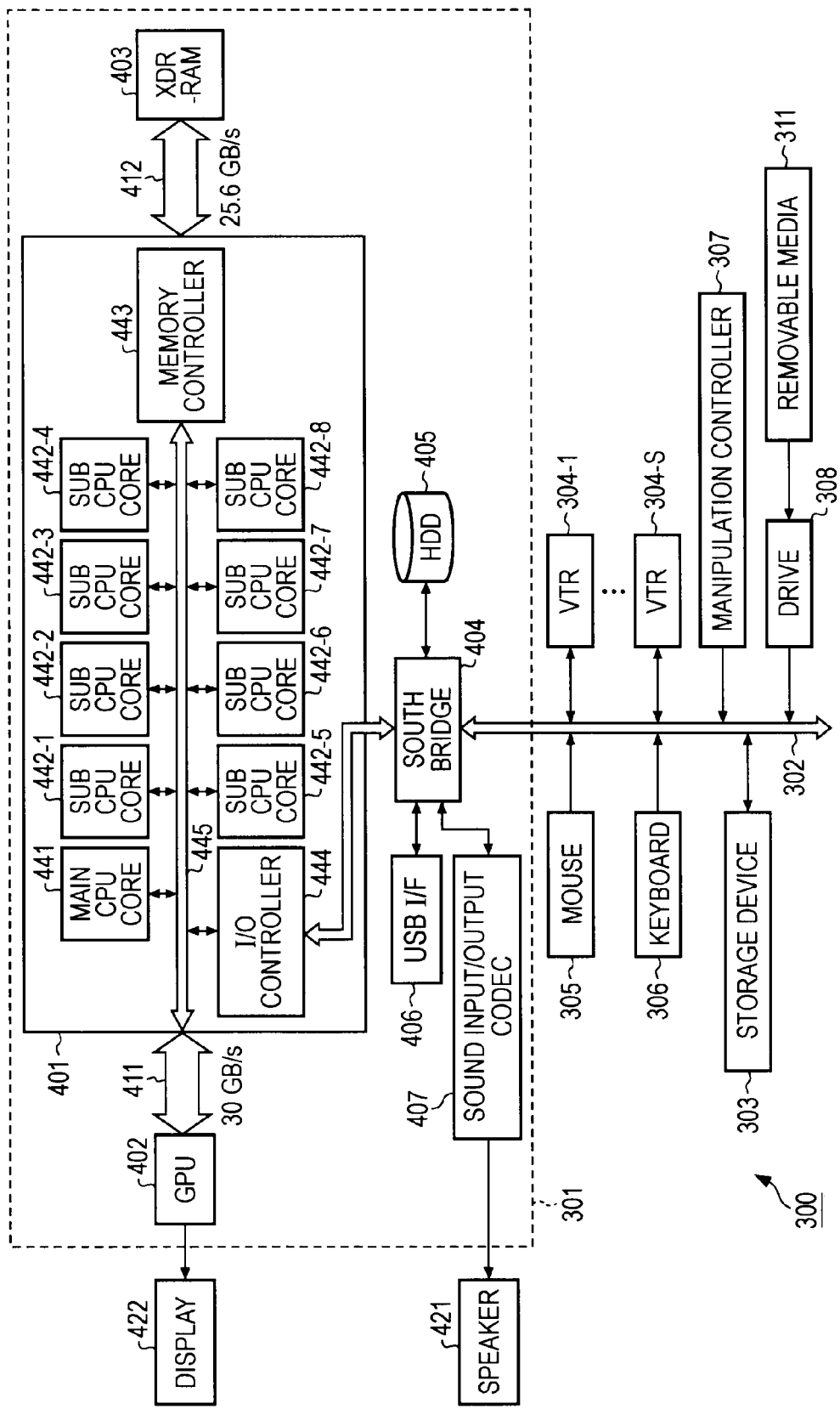
FIG. 15 is a block diagram illustrating an example of hardware resources.

Hereinafter, the method of allocating hardware resources in the case where the image encoding is performed using a CPU having a plurality of cores will be described. FIG. 15 is a block diagram illustrating an example of hardware resources at that time.

As illustrated in FIG. 15, the information processing system 300 has an information processing device 301 that performs the image encoding. To the information processing device 301, various kinds of devices are connected through a PCI bus 302. For example, a storage device 303 and a plurality of video tape recorders (VTRs) VTR304-1 to VTR304-S are connected thereto. Also, a mouse 305 for inputting user's manipulations, a keyboard 306, and a manipulation controller 307 are also connected thereto. An information processing system 300 is a system which is composed of the above-described devices and performs image encoding or image decoding by programs installed therein.

For example, the information processing device 301 of the information processing system 300 reads and encodes moving image content stored in a large-capacity storage device 303, and rewrites the obtained encoded data in the storage device 303. Further, the information processing device 301 records the encoded data obtained by the encoding in a video tape through VTR304-1 to VTR304-S. Also, the information processing device 301 receives the moving image content recorded in the video tape mounted on VTR304-1 to VTR304-S in the storage device 303. In this case, the information processing device 301 may encodes the moving image content.

The information processing device 301 includes an XDR (Extreme Data Rate)-RAM (Random Access Memory) 403 and a south bridge 404 in addition to a microprocessor 401 and a GPU (Graphics Processing Unit) 402. Also, the information processing device 301 includes an HDD (Hard Disk Drive) 405, a USB (Universal Serial bus), interface (USB I/F) 406, and a sound input/output codec 407.

The GPU 402 is connected to the microprocessor 401 through a dedicated bus 411. The XDR-RAM 403 is connected to the microprocessor 401 through a dedicated bus 412. The south bridge 404 is connected to an I/O controller 444 of the microprocessor 401. To the south bridge 404, the HDD 405, the USB interface 406, and the sound input/output codec 407 are also connected. To the sound input/output codec 407, a speaker 421 is connected. Also, to the GPU 402, a display 422 is connected. To the south bridge 404, the mouse 305, the keyboard 306, VTR304-1 to VTR304-S, the storage device 303, and the manipulation controller 307 are further connected via the PCI bus 302.

The mouse 305 and the keyboard 306 receive the user's manipulation input, and supply signal that indicate the contents of the user's manipulation input to the microprocessor 401 through the PCI bus 302 and the south bridge 404. The storage device 303 and VTR304-1 to VTR304-S record or reproduce specified data. To the PCI bus 302, a drive 308 may be further connected if necessary, removable media 311 such as a magnetic disk, an optical disk, an optomagnetic disk, a semiconductor memory, or the like, may be properly mounted, and computer programs read from the media are installed in the HDD 405 if necessary.

The microprocessor 401 has a general main CPU core 441 for executing a basic program such as OS (Operating System). Also, to the main CPU core 441, sub CPU cores 442-1 to 442-8, which are a plurality of (in this case, 8) RISC (Reduced Instruction Set Computer) type signal processors, are connected through a shared bus 445. Also, to the shared bus 445, for example, a memory controller 443 that performs memory control with respect to the XDR-RAM 403 having a capacity of 256 MBytes is also connected. Further, to the shared bus 445, an I/O (In/Out) controller 444 for managing the input/output of data with the south bridge 404. The microprocessor 401 is a multi-core processor in which the above-described configurations are integrated into one chip. The operating frequency of the microprocessor is, for example, 4 GHz.

The microprocessor 401 spreads the XDR-RAM 403 by reading a necessary application program stored in the HDD 405 based on the control program stored in the HDD 405 during starting, and then performs necessary control process based on the application program and the operator's manipulation. Also, the microprocessor 401 realizes the encoding or decoding by executing the software. For example, the microprocessor 401 supplies the encoded stream obtained as the result of encoding to the HDD 405 through the south bridge 404 to store the encoded stream in the HDD 405. Also, the microprocessor 401 transmits the reproduced image of the moving image content obtained as the result of decoding to the GPU 402 to display the image on the display 422.

Although the method of using the respective CPU cores in the microprocessor 401 is optional, for example, the main CPU core 441 performs the processing of the control unit 101, and 8 sub CPU cores 442-1 to 442-8 perform the image encoding of the image encoding unit 112. The 8 sub CPU cores 442-1 to 442-8 of the microprocessor 401 of the information processing system 300 have built-in cache memories, respectively. That is, 8 sub CPU cores 442-1 to 442-8 can use both the cache memory that is an internal memory and the XDR-RAM 403 that is an external memory.

Hereinafter, in the case where it is not necessary to separately explain the sub CPU cores 442-1 to 442-8, they are called sub CPU cores 442. The number of sub CPU cores 442 is optional although FIG. 15 illustrates 8 sub CPU cores. To the respective sub CPU cores 442, software programs for performing the image encoding are allocated by the main CPU core 441 (e.g. the software programs are loaded in the cache memories). The respective sub CPU cores 442 perform the encoding by executing the allocated software programs.

[Configuration of a Control Unit]

Figure 16:
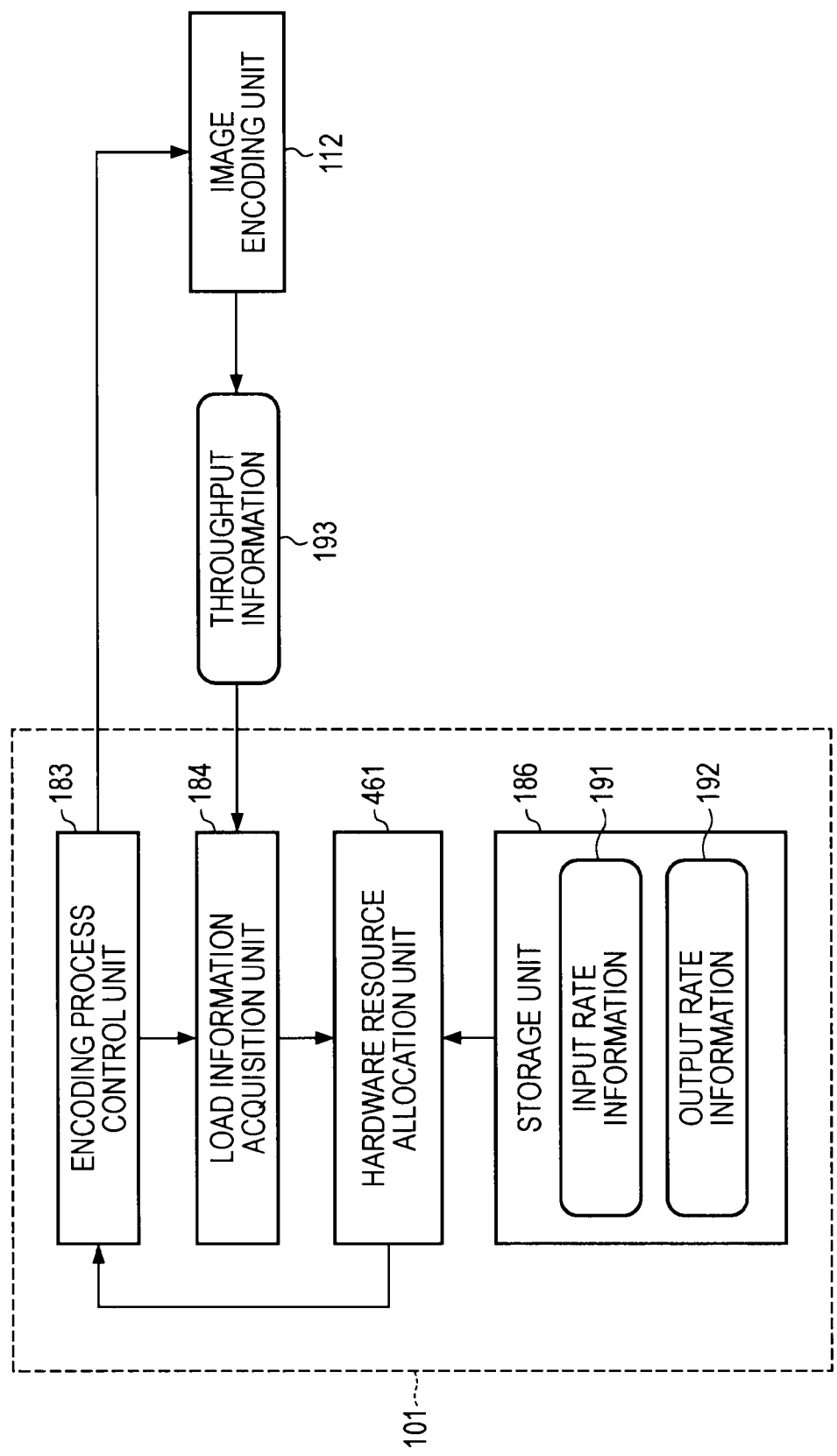
FIG. 16 is a block diagram illustrating a main configuration example of a control unit.

FIG. 16 is a block diagram illustrating a main configuration example of the control unit in the case where the image encoding is performed using the hardware resources as illustrated in FIG. 15.

In this case, the control unit 101, of which the basic configuration has basically explained with reference to FIG. 4, is configured to have a hardware resource allocation unit 461 instead of the load control unit 185. The hardware resource allocation unit 461 controls the hardware resources allocated to the image encoding, i.e. the number of cores of the sub CPU cores 442, based on the input rate information 191, the output rate information 192, and the throughput information 193. The encoding process control unit 183 performs the image encoding using the sub CPU core 442 allocated by the hardware resource allocation unit 461.

Here, it is assumed that the input rate information 191 and the output rate information 192 are pre-stored in the storage unit 186, and the input rate information acquisition unit 181 and the output rate information acquisition unit 182 are omitted. Of course, they may be provided instead.

[Flow of Processing]

Figure 17:
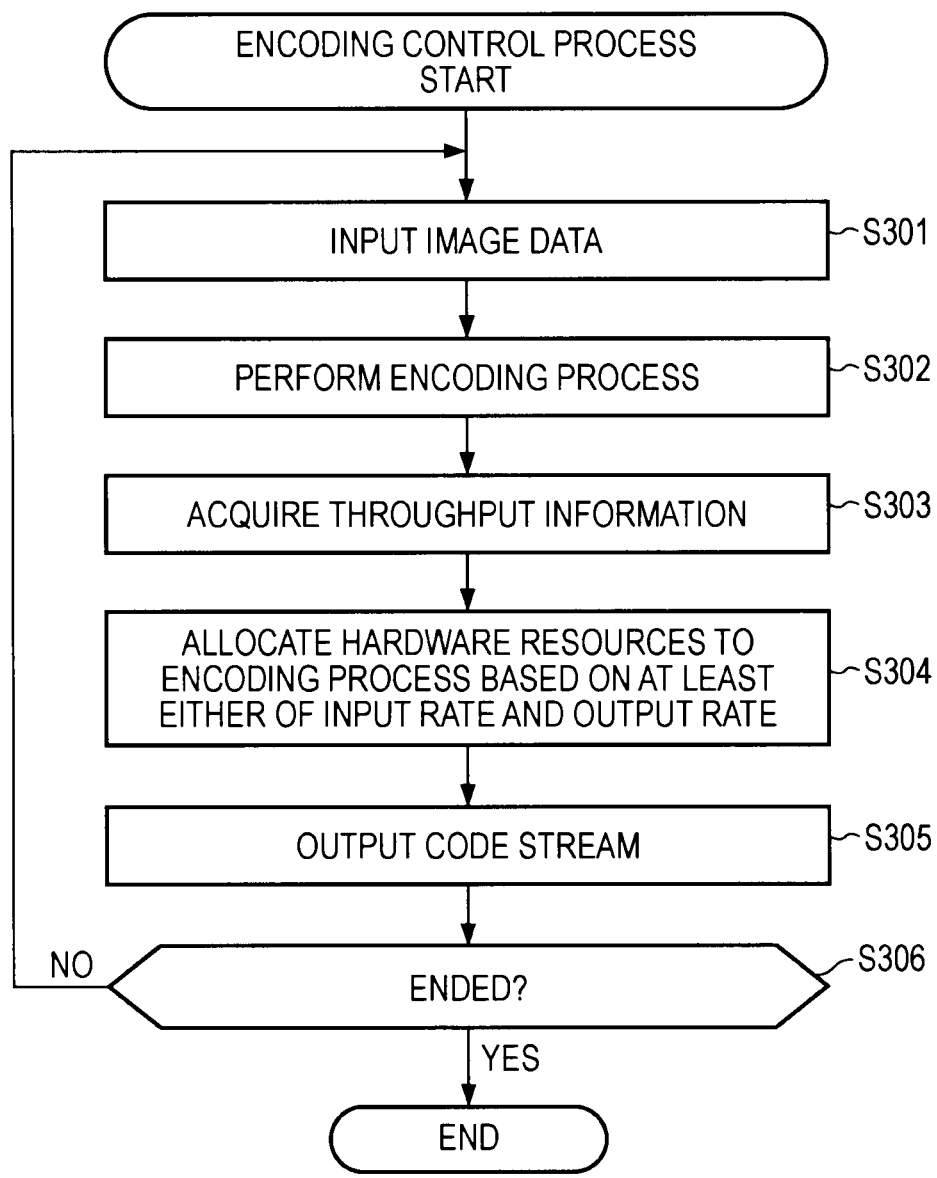
FIG. 17 is a flowchart illustrating an example of a flow of encoding control processing.

Then, an example of a flow of encoding control processing in this case will be described with reference to a flowchart of FIG. 17.

If the encoding control process starts, the encoding process control unit 183 of the control unit 101 reads the image data from the input system 111 (e.g. the cache memory 143), and inputs the read image data to the image encoding unit 112 in step S301.

In step S302, the encoding process control unit 183 controls the image encoding unit 112 to perform the image encoding for encoding the input image data. In step S303, the load information acquisition unit 184 acquires the throughput information 193 with respect to the encoding.

In step S304, the hardware resource allocation unit 461 allocates the hardware resources to a part or the whole part of the image encoding on the basis of at least either of the input rate and the output rate. In this case, for example, if the encoding method is JPEG2000, the hardware resource allocated to the whole encoding process may be controlled, or the hardware resources allocated to the entropy encoding that is performed by the EBCOT unit 221 may be controlled.

In step S305, the encoding process control unit 183 outputs the code stream generated by the image encoding to the output system 113 to process the code stream.

In step S306, the encoding process control unit 183 determines whether to end the encoding control process. For example, if it is determined that the unprocessed image data exists in the input system 111 (e.g. the cache memory 143) and the encoding control process is not ended, the processing returns to step S301 and the subsequent process is repeated.

In step S306, for example, if it is determined that the unprocessed image data does not exist in the input system 111 (e.g. the cache memory 143) and the encoding control process is ended, the encoding control process is ended.

Also, the processing in step S303 (i.e. the acquisition of throughput information) is performed on proper timing according to the contents of the information. Accordingly, for example, the processing in step S303 and step S304 may be first performed before the processing in step S302. Also, for example, during the image encoding process, the processing in the step S303 and the step S304 may be performed.

In the above-described control process, the control unit 101, if the throughput of the image encoding process is too low, can improve the throughput by increasing the hardware resources (e.g. the number of cores). Also, for example, if the throughput of the image encoding process is too high, the control unit 101 can reduce the throughput by reducing the hardware resources (e.g. the number of cores) allocated to the image encoding.

AS described above, the control unit 101 can maintain the amount of hardware resources allocated to the image processing in a more proper state on the basis of the input rate or the output rate. Since cores, which have not yet been allocated to the image encoding, can be allocated to another process, the sub CPU cores 442 can be used more effectively through the above-describe control. That is, the encoding apparatus 100 can use the hardware resources more efficiently in the encoding process.

In this case, in the case of controlling the number of CPUs allocated to the image encoding and in the case of controlling the number of threads allocated to the image encoding, the control operation is performed in the same manner as the case of controlling the number of cores.

4. Fourth Embodiment

Configuration of a Control Unit

Information on the control of the load amount as described above may be used in the allocation control of hardware resources in the decoding process. This information may be, for example, a compression rate of image encoding, throughput of image encoding, the number of cores allocated to the image encoding, or system environment conditions of the input rate or output rate according to the above-described changes. Of course, other information may be included.

Figure 18:
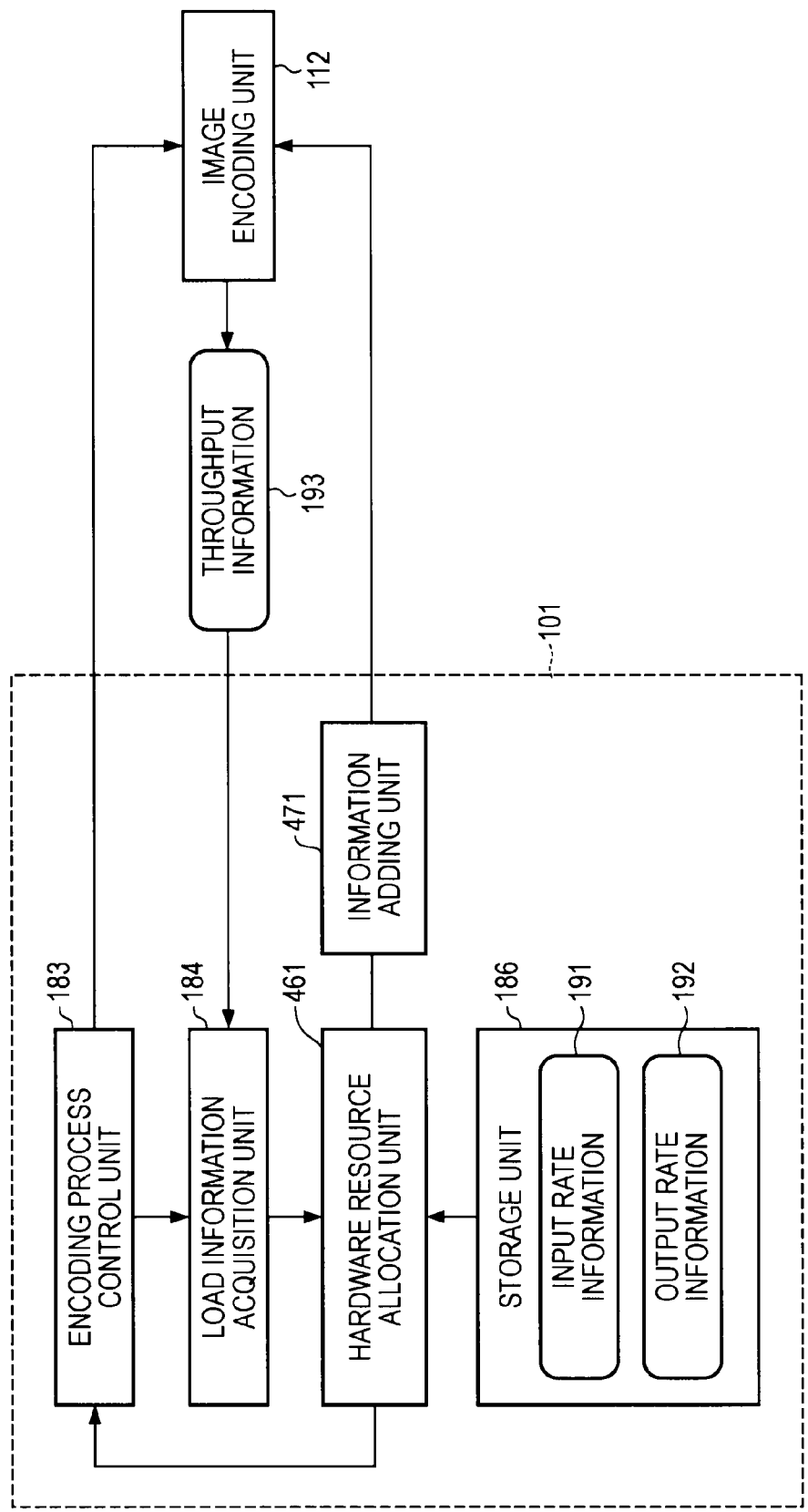
FIG. 18 is a block diagram illustrating a main configuration example of a control unit.

FIG. 18 is a block diagram illustrating a main configuration example of the control unit in this case. As illustrated in FIG. 18, in this case, the control unit 101, which basically has the same configuration as described above with reference to FIG. 16, further includes an information adding unit 471.

The information adding unit 471 adds the information on the control of the load amount, for example, such as the compression rate of the image encoding, the throughput of the image encoding, the number of cores allocated to the image encoding, or system environment conditions of the input rate or output rate according to the above-described changes, to the header of the code stream generated by the image encoding as additional control information. For example, the information adding unit 471 adds the additional control information to the main header of the code stream.

Figure 19:
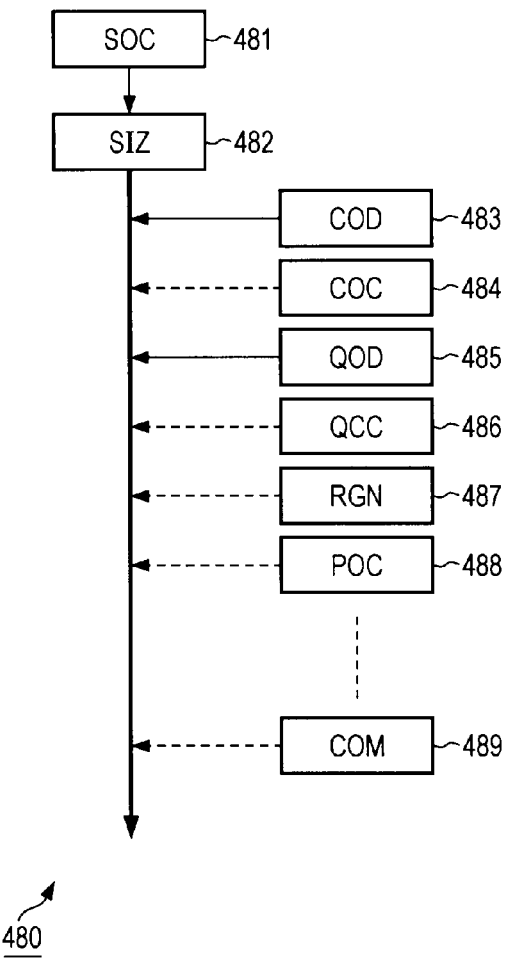
FIG. 19 is a diagram illustrating an example of a main header.

FIG. 19 is a diagram illustrating an example of the main header of the code stream in the case where the encoding method is JPEG2000. As illustrated in FIG. 19, if the encoding method is JPEG2000, SOC 481 and SIZ 482 are formed in the main header 480 of the code stream. In SIZ 482, marker segments, such as COD 483, COC 484, QCD 485, QCC 486, RGN 487, POC 488, and COM 489, are formed.

Figure 20:
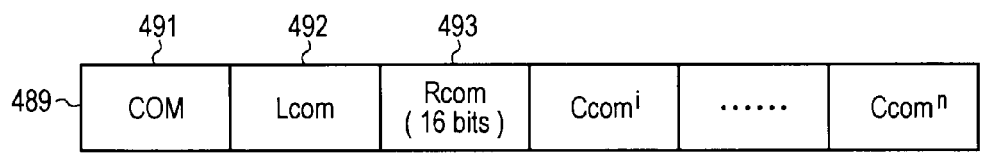
FIG. 20 is a diagram illustrating a configuration example of command syntax.

In JPEG2000, the syntax of COM 489 has been determined as shown in FIG. 20, and includes markers, such as COM 491, Lcom 492, and Rcom 493. Rcom 493 is a 16-bit parameter, in which values "0" and "1" have been reserved, but the other values have been updated to be freely used.

The information adding unit 471 adds the additional control information, such as the compression rate or the like, using values other than "0" and "1". That is, since it is possible to define values from "2" to "65,535", for example, the compression rate becomes compression rate=2/3=0.6667× 65,535=43,690.

[Flow of Processing]

Figure 21:
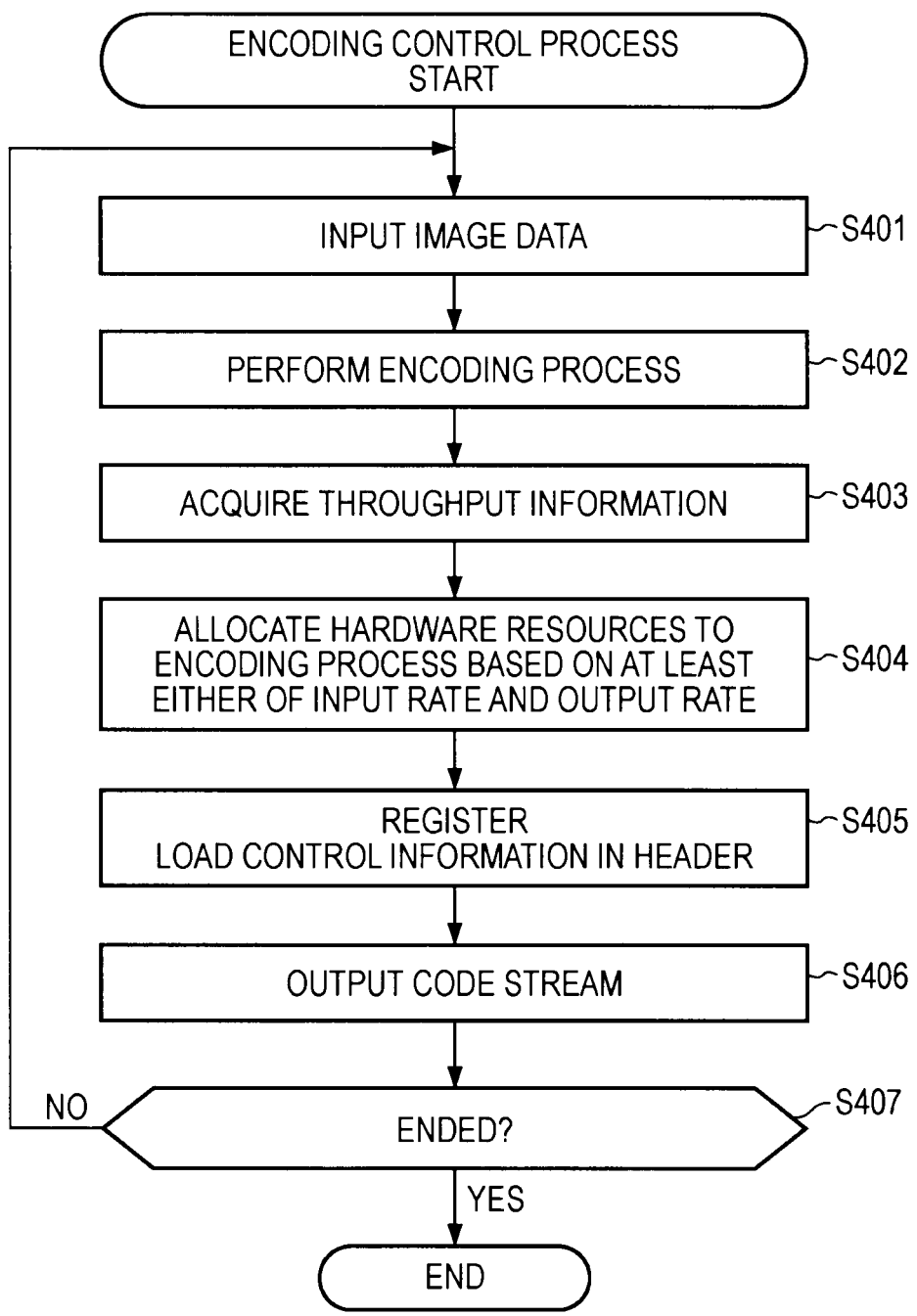
FIG. 21 is a flowchart illustrating an example of a flow of encoding control processing.

An example of a flow of encoding control processing in this case will be described with reference to a flowchart of FIG. 21.

If the encoding control processing start, the encoding process control unit 183 reads the image data from the input system 111 (e.g. the cache memory 143), and inputs to the image encoding unit 112 in step S401.

In step S402, the encoding process control unit 183 controls the image encoding unit 112 to perform the image encoding for encoding the input image data. In step S403, the load information acquisition unit 184 acquires the throughput information 193 with respect to the encoding.

In step S404, the hardware resource allocation unit 461 allocates the hardware resources to a part or the whole part of the image encoding on the basis of at least either of the input rate and the output rate. In this case, for example, if the encoding method is JPEG2000, the hardware resource allocated to the whole encoding process may be controlled, or the hardware resources allocated to the entropy encoding that is performed by the EBCOT unit 221 may be controlled.

In step S405, the information adding unit 471, for example, registers the additional control information, such the compression rate of image encoding, or the like, in the header of the code stream.

In step S406, the encoding process control unit 183 outputs the code stream generated by the image encoding to the output system 113 to process the code stream.

In step S407, the encoding process control unit 183 determines whether to end the encoding control process. For example, if it is determined that the unprocessed image data exists in the input system 111 (e.g. the cache memory 143) and the encoding control process is not ended, the processing returns to step S401 and the subsequent process is repeated.

In step S407, for example, if it is determined that the unprocessed image data does not exist in the input system 111 (e.g. the cache memory 143) and the encoding control process is ended, the encoding control process is ended.

In this case, the processing in step S403 (i.e. the acquisition of throughput information) is performed on proper timing according to the contents of the information. Accordingly, for example, the processing in step S403 and step S404 may be first performed before the processing in step S402. Also, for example, during the image encoding process, the processing in step S403 and the step S404 may be performed.

Through the above-described control process, the control unit 101 can provide the additional control information including, for example, the compression rate of an image, the number of cores allocated to the image encoding, or system environment information (i.e. history information of change conditions) when the throughput is changed, to a decoding apparatus.

5. Fifth Embodiment

Configuration of a Decoding Apparatus

The above-described load control is applicable to the decoding processing.

Figure 22:
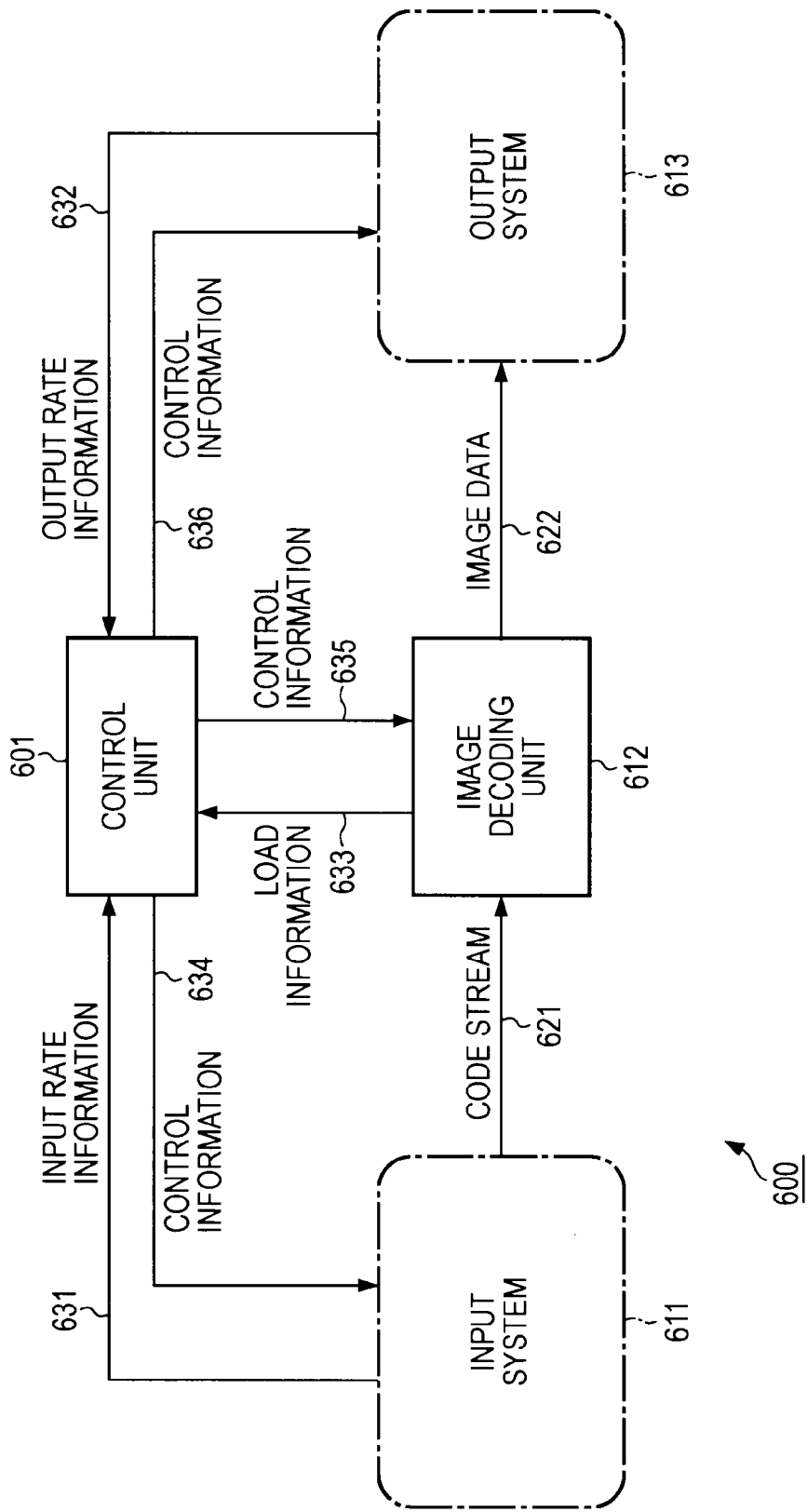
FIG. 22 is a block diagram illustrating a main configuration example of a decoding apparatus.

FIG. 22 is a block diagram illustrating a main configuration example of a decoding apparatus.

A decoding apparatus 600 illustrated in FIG. 22 is an apparatus that performs image decoding in a method corresponding to the image encoding of the encoding apparatus 100, and obtains image data by decoding the code stream generated by the encoding apparatus 100. The decoding apparatus 600 includes a control unit 601, an input system 611, an image decoding unit 612, and an output system 613.

The control unit 601 controls the input system 611 to the output system 613 to perform the decoding of the image data.

In the same manner as the input system 111, the input system 611 is a system that is composed of one or plural processing units implemented by an arbitrary hardware resource. The input system 611 is controlled by the control unit 601, and performs an arbitrary process, such as reading of code stream to be decoded from a recording medium, receiving of code stream transmitted from another apparatus through a network, and the like. Also, the input system 611 is controlled by the control unit 601, and supplies the processed image data to the image decoding unit 612 as indicated by an arrow 621.

The image decoding unit 612 is controlled by the control unit 601, and acquires the code stream supplied from the input system 611 as indicated by the arrow 621. Also, the image decoding unit 612 is controlled by the control unit 601, and generates image data by decoding the acquired code stream in a predetermined method. Further, the image decoding unit 612 is controlled by the control unit 601, and supplies the generated image data to the output system 613 as indicated by an arrow 622.

In the same manner as the output system 113, the output system 613 is a system that is composed of one or plural processing units implemented by an arbitrary hardware resource. The output system 613 is controlled by the control unit 601, and acquires the image data supplied from the image decoding unit 612 as indicated by the arrow 622. Also, the output system 613 is controlled by the control unit 601, and performs an arbitrary process, such as, for example, storing of the acquired code stream in a recording medium, transmitting of the code stream to another apparatus through a network, and the like.

The control unit 601, as indicated by an arrow 631, acquires input rate information that indicates the processing speed of the process that is performed by the input system 611. In the same manner, the control unit 601, as indicated by an arrow 632, acquires output rate information that indicates the processing speed of the process that is performed by the output system 613. Further, the control unit 601, as indicated by an arrow 633, acquires load information that indicates the load amount of the image decoding performed by the image decoding unit 612 from the image decoding unit 612.

Also, the control unit 601, as indicated by an arrow 634, controls the processing of the input system 611 by supplying control information to the input system 611. Further, the control unit 601, as indicated by an arrow 635, controls the image decoding by supplying the control information to the image decoding unit 612. Also, the control unit 601, as indicated by an arrow 636, controls the processing of the output system 613 by supplying the control information to the output system 613.

At this time, the control unit 601 determines the processing speed of the image decoding performed by the image decoding unit 612 on the basis of the input rate information, the output rate information, and the load information.

Also, in the case of the decoding apparatus 600, the load information is predicted information that indicates the size of the predicted load in the image decoding performed by the image decoding unit 612. Basically, the load information is the same as the load information in the image encoding apparatus 100.

The control unit 601 compares the processing speed of the image decoding process obtained from the load information with the processing speed of the processing of the input system 611 or the processing speed of the processing of the output system 613, and controls the processing speed of the image decoding process on the basis of the result of comparison.

For example, the control unit 601, if the processing speed of the image decoding process is lower than the processing speed of the processing of the input system 611, raises the processing speed of the image decoding process up to the processing speed of the input system 611. Also, if the processing speed of the image decoding process is higher than the processing speed of the processing of the input system 611, the control unit 601, for example, lowers the processing speed of the image decoding process to the processing speed of the input system 611. Further, for example, if the processing speed of the image decoding process is higher than the processing speed of the processing of the output system 613, the control unit 601, for example, lowers the processing speed of the image decoding process to the processing speed of the output system 613.

As described above, the control unit 601 determines the processing speed of the image decoding process in consideration of the processing speed of the processing performed by the processing units, such as the input system 611, the output system 613, and the like, in the front and in the rear of the image decoding unit 612, and thus can control the processing speed of the image decoding process so as to improve the processing speed of the whole decoding apparatus 600.

Through the above-described control, the decoding apparatus 600 can allocate the hardware resources to the decoding processing to suppress the unnecessary increase of the load. That is, the decoding apparatus 600 can utilize the hardware resources more effectively in the decoding process.

Next, a concrete example of the configuration of the decoding apparatus 600 will be described.

Figure 23:
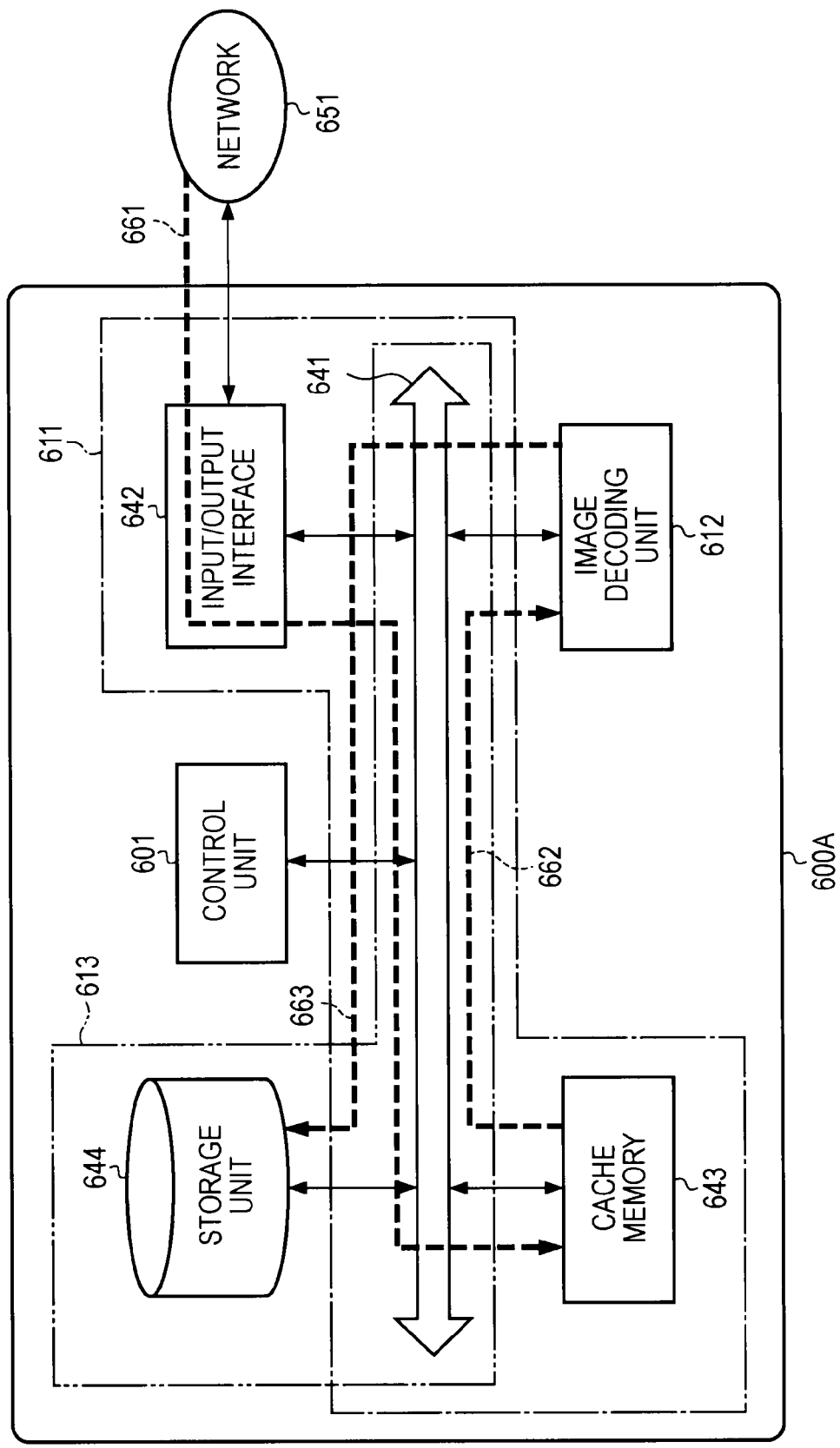
FIG. 23 is a diagram illustrating a concrete example of the decoding apparatus of FIG. 1.

FIG. 23 is a diagram illustrating a concrete example of the decoding apparatus of FIG. 22. A decoding apparatus 600A indicates a concrete example of the configuration of the decoding apparatus 600 of FIG. 22. As shown in FIG. 23, in the decoding apparatus 600A, the control unit 601 and the image decoding unit 612 are connected to a bus 641. To the bus 641, an input/output interface 641, a cache memory 643, and a storage unit 644 are further connected.

The bus 641 is the same transmission medium as the bus 141, and for example, the bus is configured by a PCI bus or the like. The input/output interface 642 is the same as the input/output interface 144, and is connected to an external network 651. For example, the input/output interface may be configured by HDMI, HD-SDI, Ethernet (registered trademark) (e.g. LAN board), or the like.

The cache memory 643 is the same recording medium as the cache memory 143, and is configured by a semiconductor memory that can exchange data at high speed in comparison to the reading speed of the storage unit 644, such as RAM, or the throughput of the input/output interface 642. The storage unit 644 is the same storage medium as the storage unit 142, and may be configured by, for example, a hard disk, a flash memory, or the like.

In the decoding apparatus 600A as configured above, the code stream to be decoded is supplied to another device through a network 651. The control unit 601, as indicated by a dotted arrow 661, controls the input/output interface 642 to acquire the code stream, supplies the code stream to the cache memory 643 through a bus 641 to maintain the code stream in the cache memory 643.

The control unit 601, as indicated by a dotted arrow 662, reads the code stream kept in the cache memory 643, and supplies the read code stream to the image decoding unit 612 through the bus 641 to decode the code stream.

The control unit 601, as indicated by a dotted line 663, supplies the image data obtained by encoding the code stream to the storage unit 644 through the bus 141 to store the image data.

That is, in the decoding apparatus 600A, as indicated by a dashed line, the input system 611 is configured by the bus 641, the input/output interface 642, and the cache memory 643, and as indicated by a double dashed line, the output system 613 is configured by the bus 641 and the storage unit 644.

Generally, in the input system 611, the input/output rate (i.e. throughput) of data of the input/output interface 642 is lower than the transmission rate of the bus 641 or the data input/output rate of the cache memory 143. Accordingly, as described above with reference to FIG. 22, if the processing speed (i.e. throughput) of the image decoding process of the image decoding unit 612 is higher than the data input/output speed of the input/output interface 642, the control unit 601 reduces the processing speed of the image decoding process of the image decoding unit 612, while if the processing speed (i.e. throughput) of the image decoding process of the image decoding unit 612 is lower than the data input/output speed of the input/output interface 642, the control unit 601 raises the processing speed of the image decoding process of the image decoding unit 612 to match the data input/output speed of the input/output interface 642 (i.e. the processing speed of the input system 611).

Generally, in the output system 613, the data record rate of the storage unit 644 is lower than the transmission rate of the bus 641. Accordingly, as described above with reference to FIG. 22, if the processing speed (i.e. throughput) of the image decoding process of the image decoding unit 612 is higher than the data recording speed of the storage unit 642, the control unit 601 reduces the processing speed of the image decoding process of the image decoding unit 612 to match the data recording speed of the storage unit 142 (i.e. the processing speed of the input system 611).

As the control unit 601 controls the decoding process as described above, the decoding apparatus 600A can suppress the occurrence of unnecessary waiting time by properly controlling the processing speeds of the respective units. That is, the decoding apparatus 600A can perform the decoding by using the hardware resources more effectively.

Figure 24:
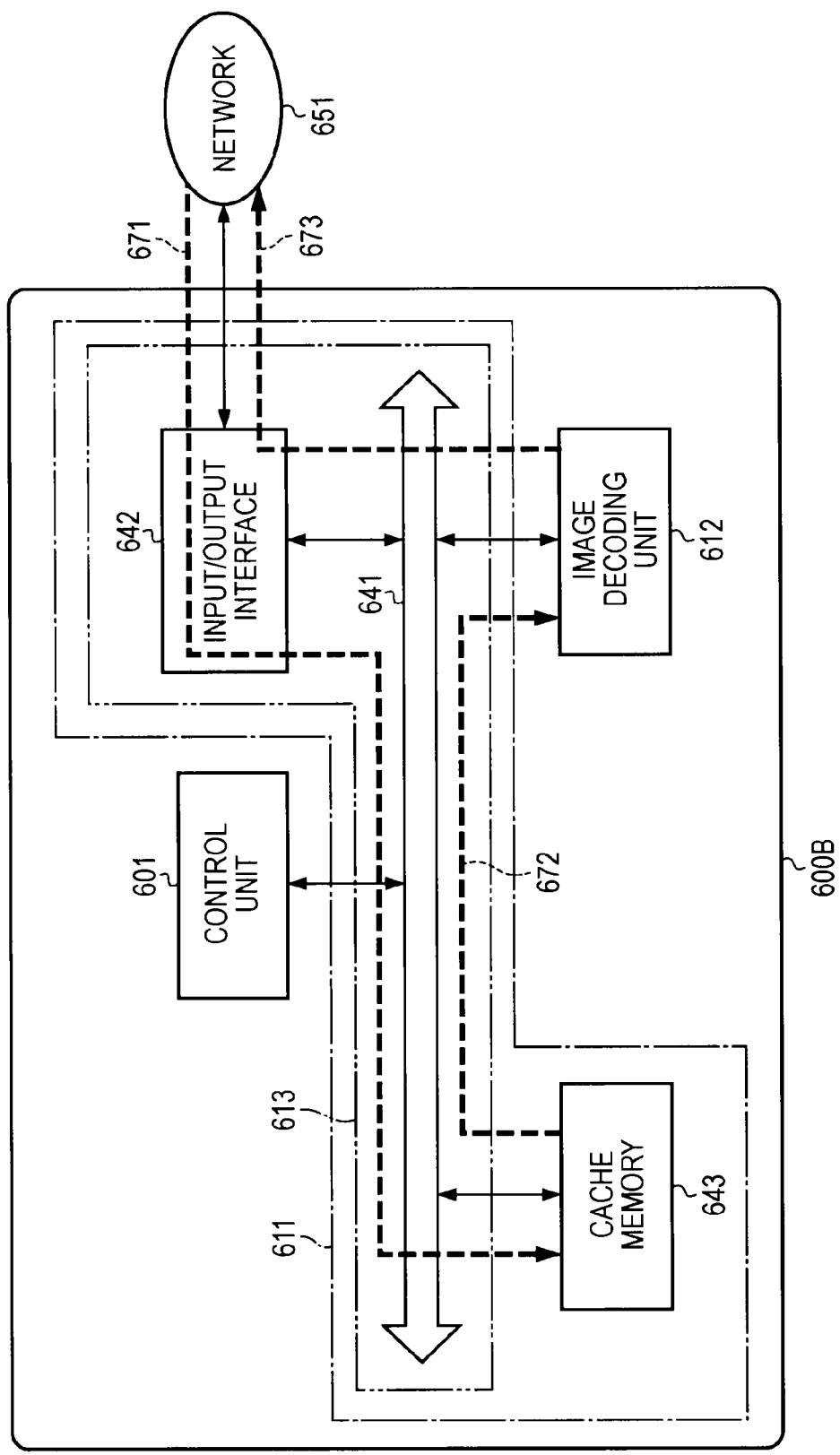
FIG. 24 is a diagram illustrating a concrete example of the decoding apparatus of FIG. 1.

FIG. 24 is a diagram illustrating another concrete example of the decoding apparatus 600 of FIG. 22.

A decoding apparatus 600B indicates another concrete example of the configuration of the decoding apparatus 600 of FIG. 22. As shown in FIG. 24, in the decoding apparatus 600B, the control unit 601 and the image decoding unit 612 are connected to the bus 641. To the bus 641, the cache memory 643 and the input/output interface 642 are further connected.

In the decoding apparatus 600B as configured above, the code stream to be decoded is supplied to another device through the network 651. The control unit 601, as indicated by a dotted arrow 671, acquires the code stream by controlling the input/output interface 642, and supplies the code stream to the cache memory 643 through the bus 641 to keep the code stream in the cache memory 643.

The control unit 601, as indicated by a dotted arrow 672, reads the code stream kept in the cache memory 643, and supplies the read code stream to the image decoding unit 612 through the bus 141 to encode the code stream.

The control unit 601, as indicated by a dotted line 673, supplies image data obtained by decoding the code stream to the input/output interface 642 through the bus 641, and the image data is output from the input/output interface 642 to an external network 651.

That is, in the decoding apparatus 600B, as indicated by a dashed line, the input system 611 is configured by the bus 641, the cache memory 643, and the input/output interface 642, and as indicated by a double dashed line, the output system 613 is configured by the bus 641 and the input/output interface 642.

Generally, in the input system 611, the input/output rate (i.e. throughput) of data of the input/output interface 642 is lower than the transmission rate of the bus 641 or the data input/output rate of the cache memory 643. Accordingly, as described above with reference to FIG. 22, if the processing speed (i.e. throughput) of the image decoding process of the image decoding unit 612 is lower than the data input/output speed of the input/output interface 642, the control unit 601 raises the processing speed of the image decoding process of the image decoding unit 612, while if the processing speed (i.e. throughput) of the image decoding process of the image decoding unit 612 is higher than the data input/output speed of the input/output interface 642, the control unit 601 reduces the processing speed of the image decoding process of the image decoding unit 612 to match the data input/output speed of the input/output interface 642 (i.e. the processing speed of the input system 611).

Also, in the output system 613, in the same manner as the case in FIG. 23, if the processing speed (i.e. throughput) of the image decoding process of the image decoding unit 612 is higher than the data input/output speed of the input/output interface 642, the control unit 601 reduces the processing speed of the image decoding process of the image decoding unit 612 to match the data input/output speed of the input/output interface 642 (i.e. the processing speed of the output system 613).

As the control unit 601 controls the decoding process as described above, the decoding apparatus 600B can suppress the occurrence of unnecessary waiting time by properly controlling the processing speeds of the respective units. That is, the decoding apparatus 600B can perform the decoding by using the hardware resources more effectively.

Figure 25:
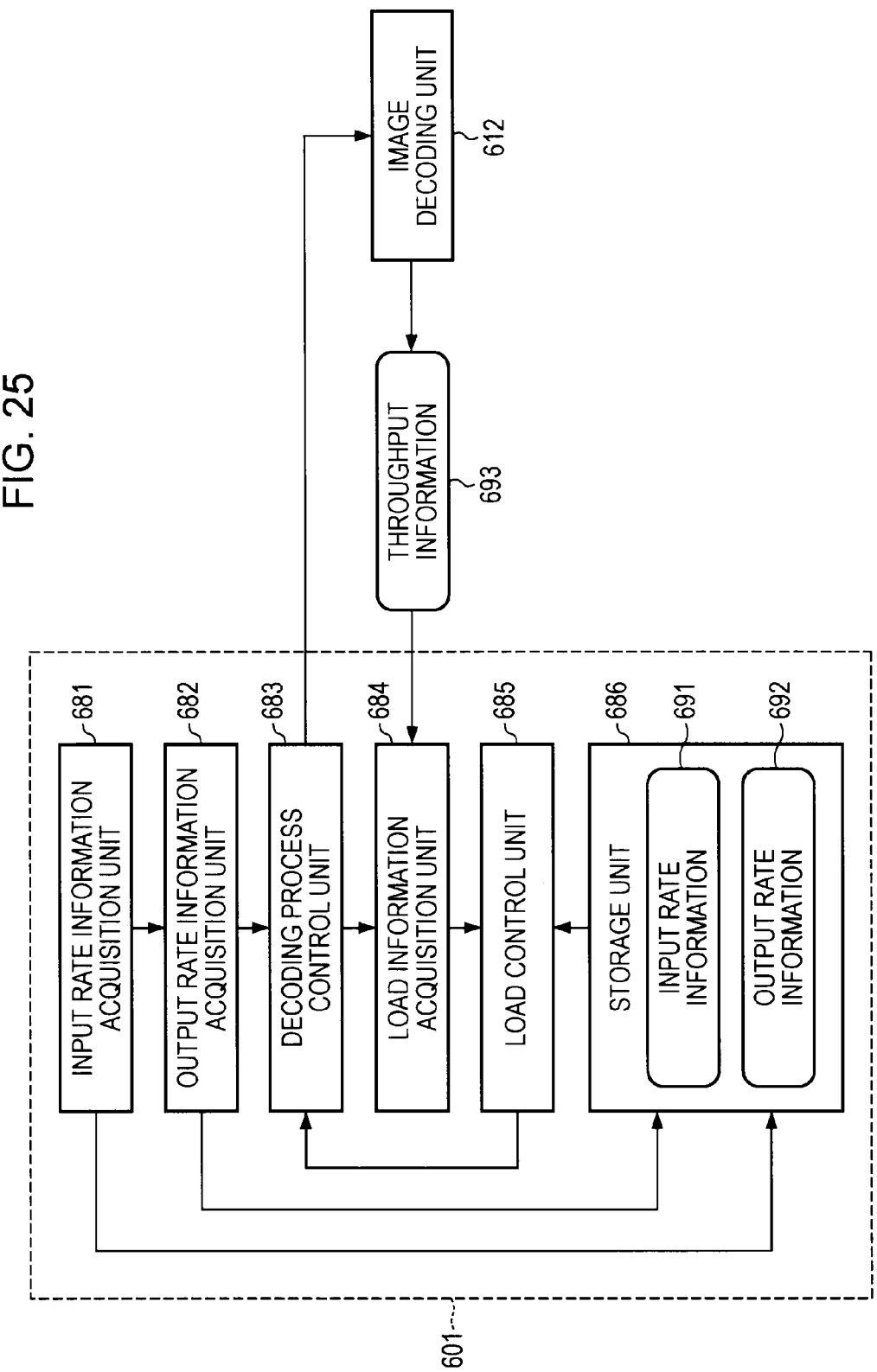
FIG. 25 is a block diagram illustrating a main configuration example of a control unit.

Then, the control unit 601 that performs the above-described control will be described. FIG. 25 is a block diagram illustrating a main configuration example of a control unit. As shown in FIG. 25, the control unit 601 includes an input rate information acquisition unit 681, an output rate information acquisition unit 682, a decoding process control unit 683, a load information acquisition unit 684, a load control unit 685, and a storage unit 686.

The input rate information acquisition unit 681 acquires input rate information 691 that indicates the throughput of the input system 611 from a device constituting the input system 611, and stores the acquired input rate information in the storage unit 686. The output rate information acquisition unit 682 acquires output rate information 692 that indicates the throughput of the output system 613 from a device constituting the output system 613, and stores the acquired output rate information in the storage unit 686.

Also, the input rate information 691 and the output rate information 692 may be values measured in the input system 611 or the output system 613, or the specification of the device constituting the output system 611 or the output system 613. Accordingly, if the device constituting the input system 611 and the output system 613 is pre-determined and their device specifications are determined as the input rate information 691 and the output rate information 692, the input rate information 691 and the output rate information

692, for example, may be pre-stored in the storage unit 686 when the product is shipped in the factory. In this case, the input rate information acquisition unit 681 and the output rate information acquisition unit 682 may be omitted.

The decoding process control unit 683 controls the decoding process of the image data performed by the image decoding unit 612. The decoding process control unit 183 controls the throughput of the decoding processing so as to reach the load amount determined by the load control unit 685.

The load information acquisition unit 684 acquires the load information that indicates the predicted value of the load size (i.e. load amount) of the image decoding process of the image decoding unit 612. For example, the load information acquisition unit 684 acquires throughput information 693 that directly or indirectly indicates the predicted value of the throughput of the image decoding process as the load information. The contents of the throughput information 693 are optional, and are configured, for example, by information that indicates the degree of difficulty in decoding the image data, throughput of the past decoding processing per unit time, or the file size of the code stream. The load information acquisition unit 684 supplies the acquired load information to the load control unit 685.

The load control unit 685 reads the input rate information 691 and the output rate information 692 from the storage unit 686, and determines the load amount of the image decoding processing performed by the image decoding unit 612 on the basis of the load information (i.e. throughput information 693) supplied from the load information acquisition unit 684. The load control unit 685 controls the throughput of the image decoding process so that it reaches the determined load amount by controlling the decoding process control unit 683.

The storage unit 686 is, for example, a storage medium configured by a semiconductor memory such as RAM or the like, and stores information such as the input rate information 691 or the output rate information 692.

[Flow of Processing]

Next, a flow of various kinds of processes performed by the decoding apparatus 600 will be described. First, an example of a flow of the decoding control process performed by the control unit 601 will be described with reference to a flowchart of FIG. 26.

If the decoding control process starts, the input rate information acquisition unit 681 of the control unit 601 acquires the input rate information in step S601. In step S602, the output rate information acquisition unit 682 acquires the output rate information in step S602. In step S603, the decoding process control unit 683 reads the code stream from the input system 611 (e.g. the cache memory 643), and inputs the read code stream to the image decoding unit 612.

In step S604, the decoding process control unit 683 controls the image decoding unit 612 to perform the image decoding process for decoding the input image data. In step S605, the load information acquisition unit 684 acquires the throughput information 693 for the decoding process.

In step S606, the load control unit 685 controls the throughput of the image decoding process that is performed by the control in step S604 on the basis of at least either of the input rate and the output rate.

In step S607, the decoding process control unit 683 outputs the image data generated by the image decoding process to the output system 613 to process the image data.

In step S608, the decoding process control unit 683 determines whether to end the decoding control process. For example, if it is determined that unprocessed image data exists in the input system 611 (e.g. the cache memory 643) and thus the decoding control process is not ended, the decoding process control unit 683 returns to step S601 and repeats the subsequent processing.

In this case, if the input rate is a fixed value, the processing in step S601 can be omitted. In the same manner, if the output rate is a fixed value, the processing in step S602 can be omitted.

In step S608, if it is determined that, for example, unprocessed image data does not exist in the input system 611 (e.g. the cache memory 643) and thus the decoding control process is ended, the decoding control process is ended.

Also, the processing in step S605 (i.e. the acquisition of the throughput information) is performed on the proper timing in accordance with the contents of the information. Accordingly, for example, it is possible that the processing in step S605 and the processing in step S606 are performed prior to the processing in step S604. Also, for example, it is also possible that during the performing of the image decoding process, the processing in step S605 and the processing in step S606 are performed.

Figure 26:
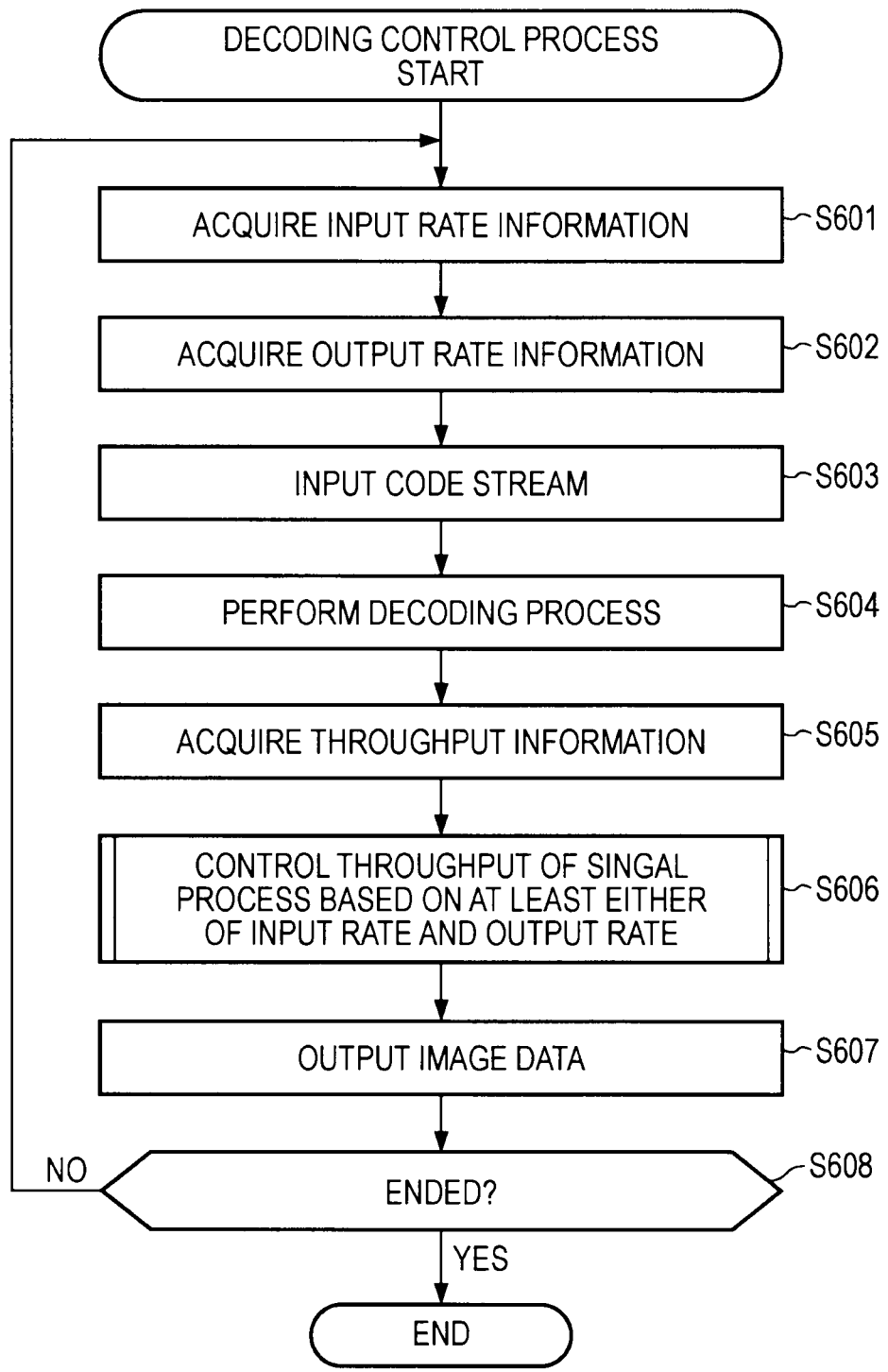
FIG. 26 is a flowchart illustrating an example of a flow of decoding control processing.

Next, an example of a detailed flow of the load control process that is performed in step S606 of FIG. 26 will be described with reference to a flowchart of FIG. 27.

If the load control process starts, the load control unit 685 determines whether the throughput of the decoding processing is lower than the input rate on the basis of the input rate information 691 and the throughput information 693 in step S621.

If it is determined that the throughput of the decoding process is lower than the input rate, the processing goes to step S622. In this case, the processing speed of the image decoding process is too low, and thus the processing in the input system 611 may overflow. That is, the consumption of hardware resources in the image decoding process becomes too small. If there are enough hardware resources, the throughput of the decoding apparatus 600 can be improved by making the image decoding process further consume the hardware resources and thus suppressing the occurrence of the overflow in the input system 611. Accordingly, in step S622, the load control unit 685 raises the throughput of the image decoding process up to the output rate by raising the processing speed of the image decoding process of the image decoding unit 612. If the processing in step S622 is ended, the processing returns to step S606 in FIG. 26, and the subsequent processing is performed.

If it is determined that the throughput of the decoding process is not lower than the input rate, the processing goes to step S623. The load control unit 685 determines whether the throughput of the decoding process is higher than the output rate on the basis of the output rate information 691 and the throughput information 693 in step S623.

If it is determined that the throughput of the decoding process is higher than the output rate, the processing goes to step S624. In this case, the processing speed of the image decoding process is too high, and thus the supply of the code stream from the input system 611 is unable to follow the processing speed. That is, the image decoding process unnecessarily consumes the hardware resources. Accordingly, the load control unit 685 reduces the processing speed of the image decoding process of the image decoding unit 612 in step S624, and lowers the throughput of the image decoding process to the level of the input rate. If the processing in step S624 is ended, the processing returns to step S606 of FIG. 26, and the subsequent processing is preformed.

If it is determined that the throughput of the decoding process is not higher than the output rate, the processing goes to step S625. The load control unit 685 determines whether the throughput of the decoding process is higher than the output rate on the basis of the output rate information 692 and the throughput information 693 in step S625.

If it is determined that the throughput of the decoding process is higher than the output rate, the processing goes to step S626. In this case, the processing speed of the image decoding process is too high, and thus the processing in the output system 613 may overflow. That is, the image decoding process unnecessarily consumes the hardware resource. Accordingly, in step S626, the load control unit 685 lowers the throughput of the image decoding process to the output level by reducing the processing speed of the image decoding process of the image decoding unit 612. If the processing in step S626 is ended, the processing returns to step S606 of FIG. 26, and the subsequent processing is performed.

If it is determined that the throughput of the decoding process is not higher than the output rate, the load control process is ended, the processing returns to step S606, and then the subsequent processing is performed.

As the above-described control process is performed, the decoding apparatus 600 can utilize the hardware resources more effectively in the decoding process.

Figure 27:
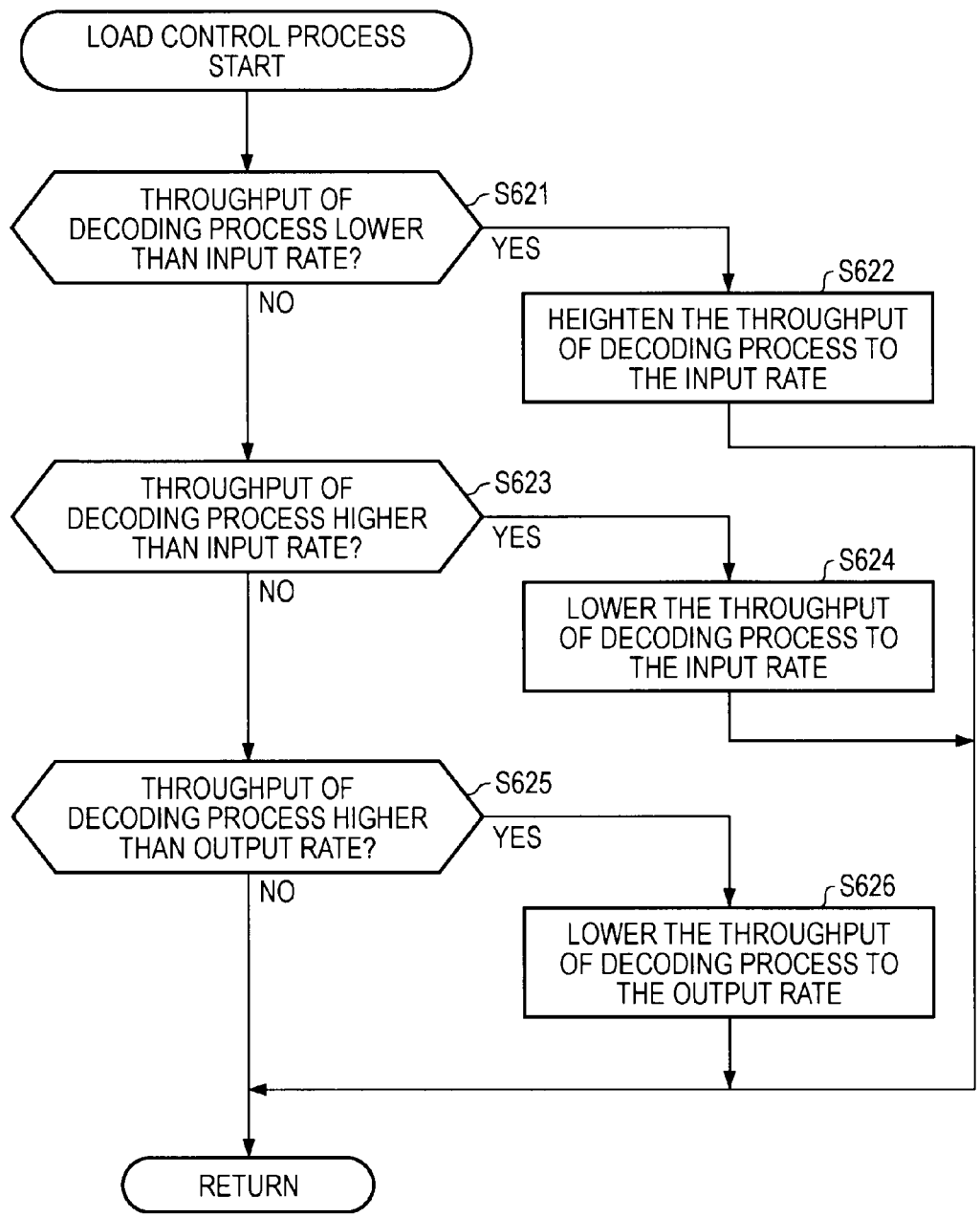
FIG. 27 is a flowchart illustrating an example of a flow of load control processing.

In FIG. 27, it is described that the determination processes in steps S621, S623, and S625 are performed in the order of the flowchart as illustrated in FIG. 27. However, the priority of determination conditions is optional, and the determination processes can be performed in any selected order. Also, the control of the throughput of the decoding processing (e.g. steps S622, S624, and S626) may be performed only when a plurality of determination conditions are satisfied.

6. Sixth Embodiment

Configuration of an Image Decoding Unit

Figure 28:
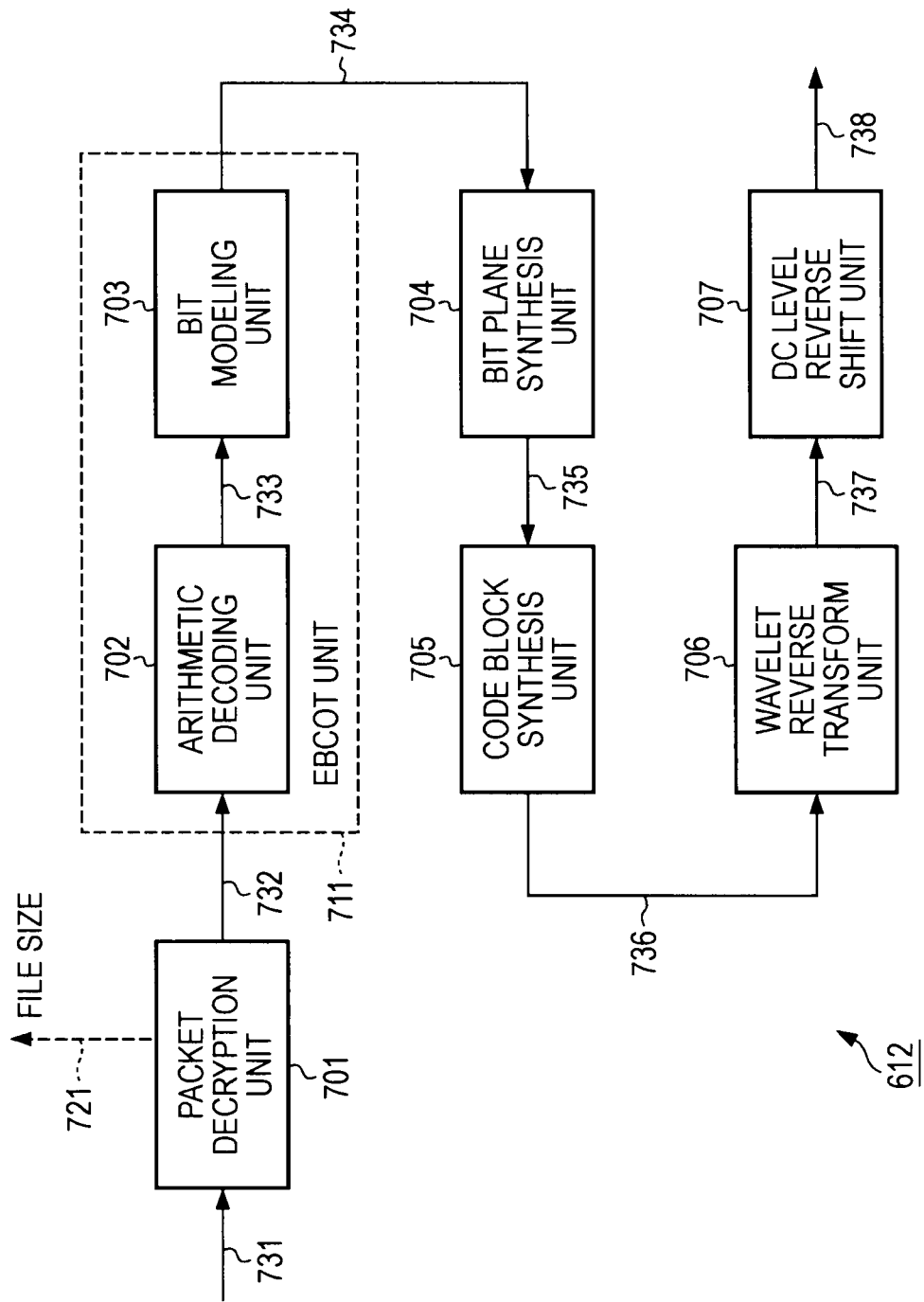
FIG. 28 is a block diagram illustrating a main configuration example of an image decoding unit.

As described above, the encoding method is optional. That is, the decoding method of the image decoding process performed by the image decoding unit 612 is optional. Hereinafter, a case in which JPEG2000 is adopted as the encoding method will be described. FIG. 28 is a block diagram illustrating a main configuration example of an image decoding unit 612. As illustrated in FIG. 28, the image decoding unit 612 includes packet decryption unit 701, an arithmetic decoding unit 702, a bit modeling unit 703, a bit plane synthesis unit 704, a code block synthesis unit 705, a wavelet reverse transform unit 706, and a DC level reverse shift unit 707.

The packet decryption unit 701, as indicated by an arrow 731, decrypts a packet supplied from the encoding apparatus 100, and supplies the code stream to the arithmetic decoding unit 702 as indicated by an arrow 732. Also, the packet decryption unit 701 decrypts the packet of the code stream, extracts the file size of the code stream, and as indicated by an arrow 721, supplies the file size to the load information acquisition unit 684 as the load information.

The arithmetic decoding unit 702 and the bit modeling unit 703 operate as the EBCOT unit 711, and perform entropy decoding of the input code stream, which is called EBCOT determined in the JPEG2000 standard.

The arithmetic decoding unit 702 decodes the code stream in a method corresponding to the arithmetic encoding unit 207, and supplies the context to the bit modeling unit 703 as indicated by an arrow 733. The bit modeling unit 703 is a method corresponding to the bit modeling unit 206, and generates wavelet coefficients spread on the bit planes. The bit modeling unit 703 supplies coefficient data for each generated bit plane to the bit plane synthesis unit 704 as indicated by an arrow 734.

The bit plane synthesis unit 704 synthesizes the wavelet coefficients spread on the bit planes. The bit plane synthesis unit 704 supplies the wavelet coefficients synthesized with the bit planes to the code block synthesis unit 705 as indicated by an arrow 735.

The code block synthesis unit 705 generates coefficient data in code block unit by using the supplied bit planes, and synthesizes the coefficient data to generate coefficient data for each sub-band. The code block synthesis unit 705 supplies the coefficient data to the wavelet reverse transform unit 706 as indicated by an arrow 736.

The wavelet reverse transform unit 706 performs wavelet reverse transform of the supplied wavelet coefficients, and generates image data of a base band. The wavelet reverse transform unit 706 supplies the generated image data of the base band to the DC level reverse shift unit 707 as indicated by an arrow 737.

The DC level reverse shift unit 707 performs DC level reverse shift process with respect to the DC component of the image data to return the shifted state performed by the DC level shift unit 201 to the original state. The DC level reverse shift unit 707 outputs the image data after the DC level reverse shift processing to the outside of the image decoding unit 612 (i.e. output system 613) as indicated by an arrow 738.

[Configuration of a Control Unit]

Figure 29:
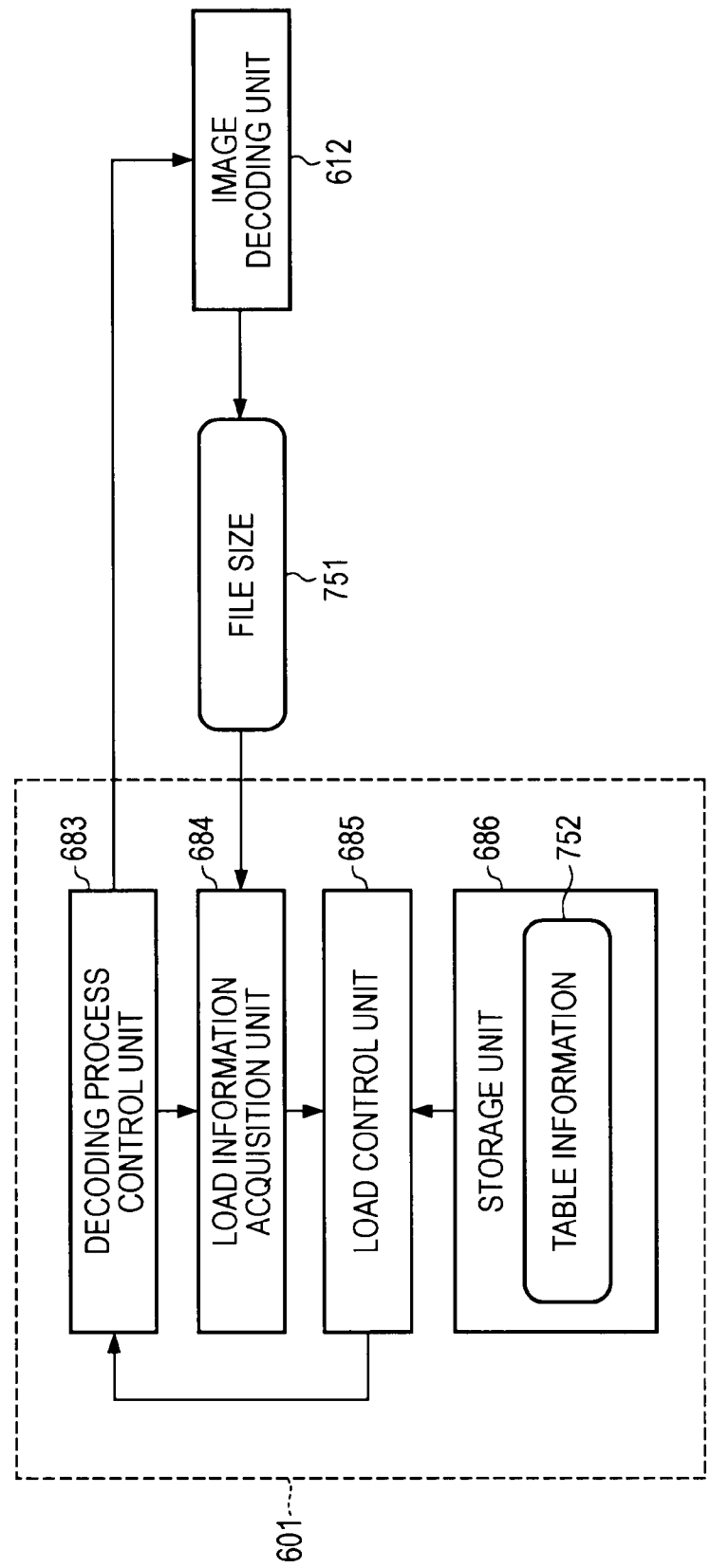
FIG. 29 is a block diagram illustrating a main configuration example of a control unit.

Next, a control unit for controlling the image decoding unit 612 will be described. FIG. 29 is a block diagram illustrating a main configuration example of a control unit. In FIG. 29, the control unit 601 basically has the same configuration as the described with reference to FIG. 25. That is, the control unit 101 has the decoding process control unit 683, the storage unit 686, and the like.

In this case, however, the load information acquisition unit 684 of the control unit 601 acquires the file size of the code stream from the packet decryption unit 701 of the image decoding unit 612 as the load information. The degree of difficulty of decoding process is briefly in proportion to the file size of the code stream to be decoded. That is, as the file size becomes larger, the degree of difficulty of the decoding process is increased, and thus it is expected that the load amount of the decoding process is increased.

In the storage unit 686, table information 752 is stored instead of the input rate information 691 or the output rate information 692. Table information 752 is table information for determining the control amount of the processing speed of the image decoding from the file size 751. In the table information 752, the corresponding relations between the file size of the code stream and the control amount of the processing speed of the image decoding are prepared in consideration of the input rate and the output rate.

The load control unit 685 obtains the control amount of the processing speed of the image decoding that corresponds to the value of the file size 751 acquired by the load information acquisition unit 684 using the table information 752 read from the storage unit 686, and control s the decoding process control unit 683 using the control amount. By doing this, the load control unit 685 controls the load amount of the image decoding on the basis of the input rate, the output rate, and the load information.

Accordingly, in the same manner as described above, the decoding apparatus 600 can utilize the hardware resources more effectively in the decoding process.

Also, in this case, the input rate information acquisition unit 681 and the output rate information acquisition unit 682 as illustrated in FIG. 25 are omitted.

[Flow of Processing]

Figure 30:
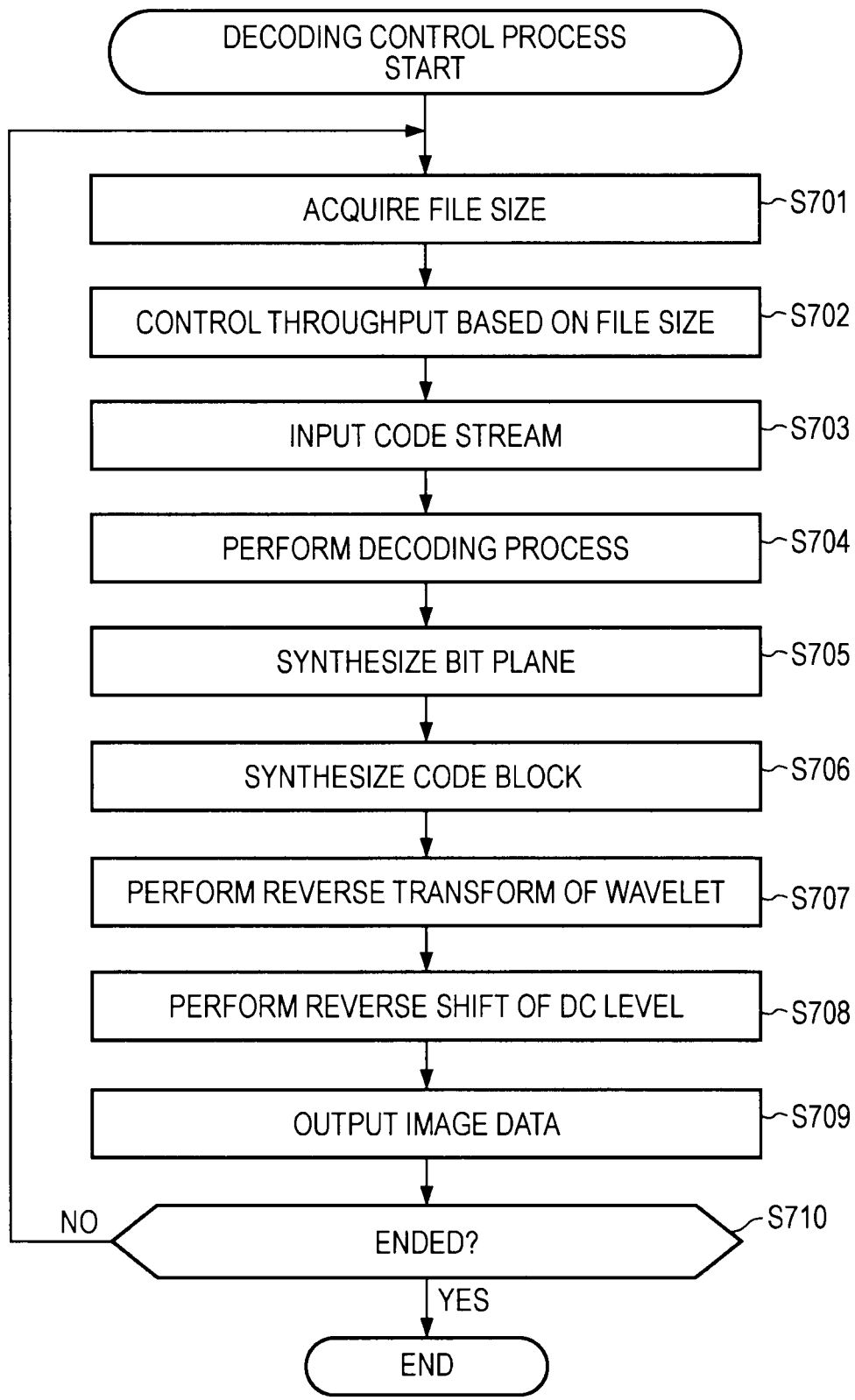
FIG. 30 is a flowchart illustrating an example of a flow of decoding control processing.

Next, an example of a flow of the decoding control process in this case will be described with reference to a flowchart of FIG. 30.

If the decoding control process starts, the load information acquisition unit 684 controls the packet decryption unit 701 to acquire the file size 751 of the code stream to be decoded in step S701. In step S702, the load control unit 685 controls the throughput based on the acquired file size 751 and the table information 752.

In step S703, the decoding process control unit 683 inputs the code stream from the input system 611 (e.g. the cache memory 643) to the image decoding unit 612.

In step S704, the decoding process control unit 683 controls the EBCOT unit 711 to perform the entropy decoding with the throughput determined by the load control unit 685.

In step S705, the decoding process control unit 683 controls the bit plane synthesis unit 704 to synthesize the bit planes of the coefficient data generated by the decoding process. In step S706, the decoding process control unit 683 controls the code block synthesis unit 705 to synthesize the coefficient data code blocks, and generates coefficient data for each sub-band.

In step S707, the decoding process control unit 683 controls the wavelet reverse transform unit 706 to perform wavelet reverse transform of the coefficient data for each sub-band, and generates image data of a base band. In step S708, the decoding process control unit 683 controls the DC level reverse shift unit 707 to perform reverse shift of the DC level. The decoding process control unit 683 controls the DC level reverse shift unit 707 to output the processed image data to the output system 613 in step S709.

In step S710, the decoding process control unit 683 determines whether to end the decoding process. If it is determined not to end the decoding process, the processing returns to step S701, and the subsequent process is repeated. Also, in step S701, if it is determined that the decoding process is ended, the decoding process is ended.

By performing the above-described control, the decoding apparatus 600 can utilize the hardware resources more effectively in the decoding process. Also, since the decoding apparatus 600 performs the load control on the basis of the file size of the code stream, it can utilize the hardware resources more effectively.

In this case, the control unit 601 may perform the throughput control of the decoding process on the basis of the additional control information added to the main header or the like. The load control information, for example, is configured by the compression rate of the image data, hardware resources (e.g. the number of cores or the like) allocated in the image encoding process, or system environment information (e.g. change condition history information) when the throughput is controlled.

In any case, table information corresponding to the load control information is prepared in advance in the storage unit 686, and thus the load control unit 685 obtains the control amount corresponding to the acquired value of the load control information.

By doing this, the decoding apparatus 600 can utilize the hardware resources more effectively.

In this case, the method of controlling throughput of the image decoding process is optional. For example, the clock speed of the image decoding process may be changed, the allocated to the execution of the image decoding process may be increased or decreased, or the decoding method may be changed.

Also, for example, the image decoding performed by the image decoding unit 612 may be implemented by software, and in this case, the control unit 601 may control the throughput of the image decoding by increasing or decreasing the amount of hardware resource allocated to the image decoding process. For example, in the case of performing the image encoding using a plurality of CPUs, a CPU (Central Processing Unit) having a plurality of cores, or a CPU corresponding to multi-thread, the control unit 601 may control the throughput of the image processing by increasing or decreasing the number of CPUs, the number of cores, or the number of threads.

7. Seventh Embodiment

Configuration of a Control Unit

Hereinafter, the method of allocating hardware resources in the case where the image decoding is performed using a CPU having a plurality of cores will be described.

Figure 31:
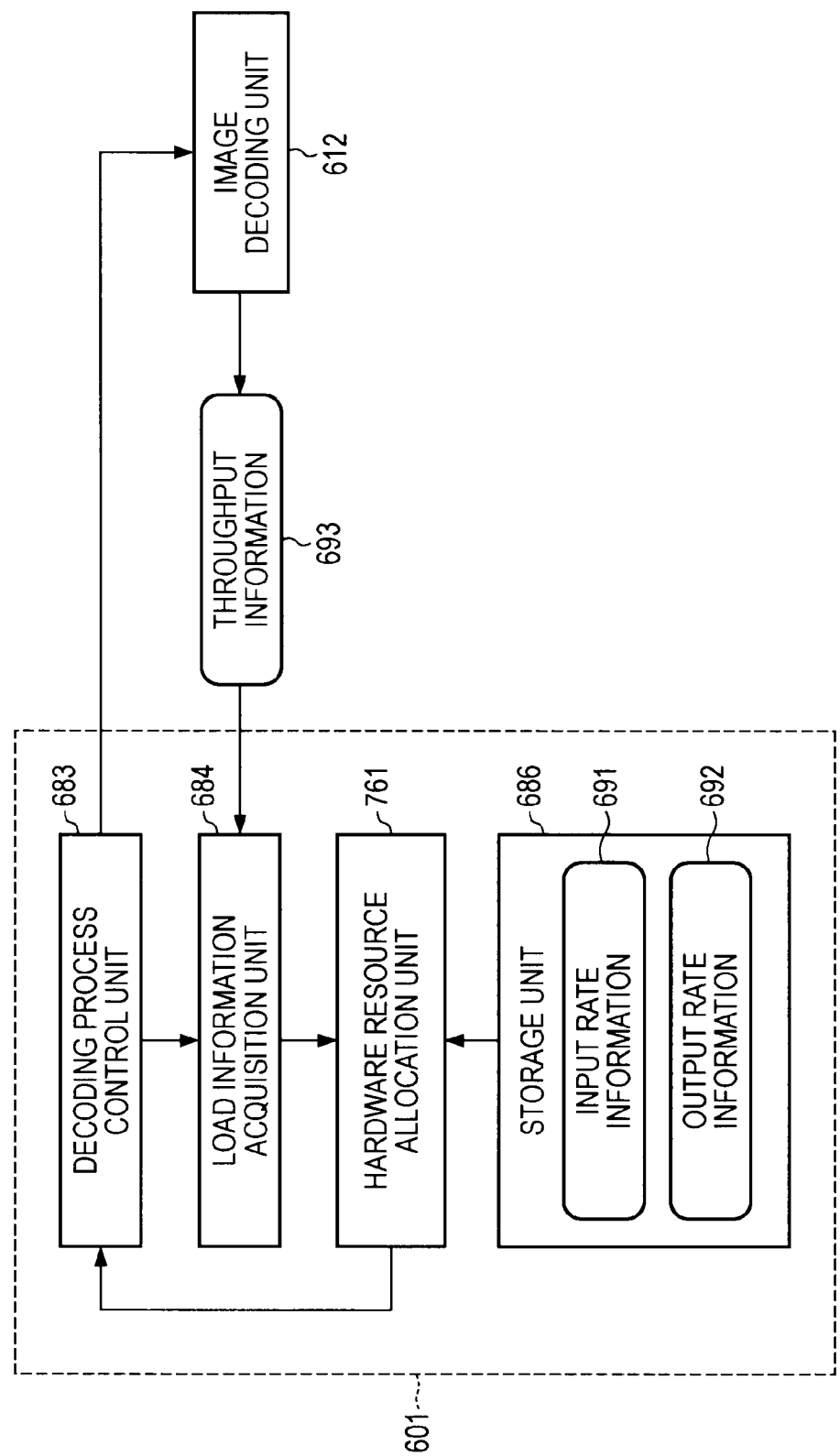
FIG. 31 is a block diagram illustrating a main configuration example of a control unit.

FIG. 31 is a block diagram illustrating a main configuration example of a control unit in the case where the image decoding is performed using hardware resources having a CPU having a plurality of cores as shown in FIG. 15.

In the case, although the configuration of the control unit 601 is basically the same as that of the control unit as described above with reference to FIG. 25, a hardware resource allocation unit 761 is adopted instead of the load control unit 685. The hardware resource allocation unit 761 controls the hardware resources allocated to the image decoding processing, i.e. the number of cores of the sub CPU cores 442, based on the input rate information 691, the output rate information 692, and the throughput information 693. The decoding process control unit 683 performs the image decoding process using the sub CPU cores 442 allocated by the hardware resource allocation unit 761.

In this case, it is assumed that the input rate information 691 and the output rate information 692 are pre-stored in the storage unit 686, and the input rate information acquisition unit 681 and the output rate information acquisition unit 682 are omitted. Of course, they may be provided instead.

[Flow of Processing]

Figure 32:
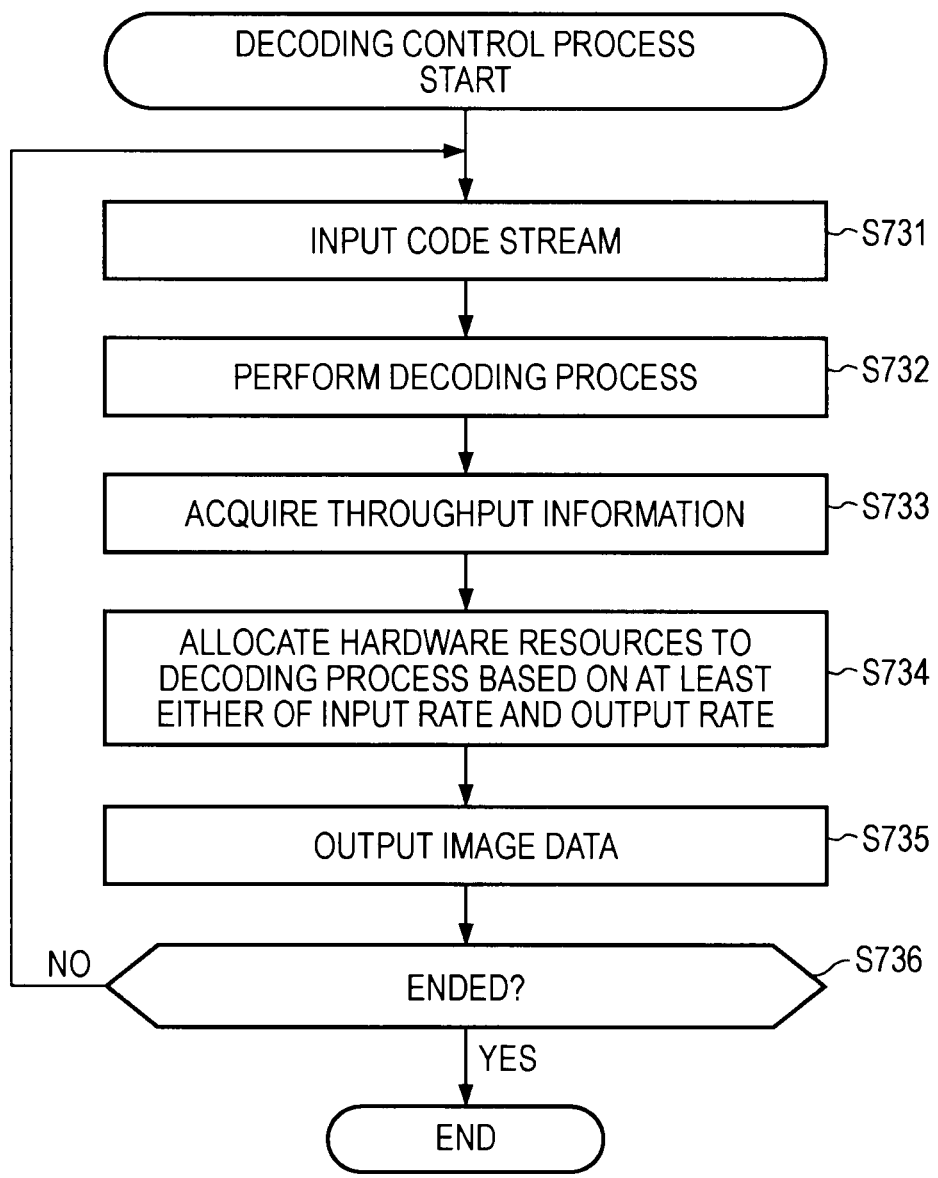
FIG. 32 is a flowchart illustrating an example of a flow of decoding control processing.

Next, an example of a flow of decoding control process in this case will be described with reference to a flowchart of FIG. 32.

If the decoding control process starts, the decoding process control unit 683 of the control unit 601 reads the code stream from the input system 611 (e.g. the cache memory 643), and inputs the read code stream to the image decoding unit 612 in step S731.

In step S732, the decoding process control unit 683 controls the image decoding unit 612 to perform the image decoding for decoding the input image data. In step S733, the load information acquisition unit 684 acquires the throughput information 693 with respect to the decoding process.

In step S734, the hardware resource allocation unit 761 allocates the hardware resources to a part or the whole part of the image decoding process on the basis of at least either of the input rate and the output rate. In this case, for example, if the decoding method is JPEG2000, the hardware resource allocated to the whole decoding process may be controlled, or the hardware resources allocated to the entropy decoding process that is performed by the EBCOT unit 711 may be controlled.

In step S735, the decoding process control unit 683 outputs the image data generated by the image decoding to the output system 613 to process the image data. In step S736, the decoding process control unit 683 determines whether to end the decoding control process. For example, if it is determined that the unprocessed image data exists in the input system 611 (e.g. the cache memory 643) and the decoding control process is not ended, the processing returns to step S731 and the subsequent process is repeated.

In step S736, for example, if it is determined that the unprocessed image data does not exist in the input system 611 (e.g. the cache memory 643) and the decoding control process is ended, the decoding control process is ended.

Also, the processing in step S733 (i.e. the acquisition of throughput information) is performed on proper timing according to the contents of the information. Accordingly, for example, the processing in step S733 and step S734 may be first performed before the processing in step S732. Also, for example, during the image decoding process, the processing in step S733 and the step S734 may be performed.

In the above-described control process, the control unit 601, if the throughput of the image decoding process is too low, can improve the throughput by increasing the hardware resources (e.g. the number of cores). Also, for example, if the throughput of the image decoding process is too high, the control unit 601 can reduce the throughput by reducing the hardware resources (e.g. the number of cores) allocated to the image decoding process.

AS described above, the control unit 601 can maintain the amount of hardware resources allocated to the decoding process in a more proper state on the basis of the input rate or the output rate. Since cores, which have not yet been allocated to the image decoding process, can be allocated to another process, the sub CPU cores 442 can be used more effectively through the above-describe control. That is, the encoding apparatus 600 can use the hardware resources more efficiently in the decoding process.

Also, in the case of controlling the number of CPUs allocated to the image decoding process and in the case of controlling the number of threads allocated to the image decoding, the control operation is performed in the same manner as the case of controlling the number of cores.

In the case of executing the series of processing using software, a program included in the software is installed from a network or a recording medium. This recording medium, for example, as shown in FIG. 15, includes, separately from the device main body, a magnetic disk (including a flexible disk) recorded with a program distribute to transfer the program to a user, an optical disk (including CD-ROM (Compact Disk-Read Only Memory) and DVD (Digital Versatile Disk), opto-magnetic disk (including MD (Mini Disk)), a removable media 311 composed of a semiconductor memory, HDD 405 recorded with a program, which is transferred to a user in a state where it is pre-inserted into the device main body, a hard disk or a memory included in a storage device 303, or the like.

In the description of the invention, the steps describing a program recorded in a recording medium include not only processing performed in a time-series manner according to the order as described above but also processing performed in parallel or separately even if not necessarily performed in the time-series manner.

In the case of executing the series of processing using software, a program included in the software is installed in a computer provided in dedicated hardware or installed in a general-purpose personal computer, which is capable of executing various kinds of functions when various programs are installed.

In addition, in this specification, the system indicates the entire apparatus formed by a plurality of devices.

As described above, a configuration explained as one device (or processing unit) may be divided into a plurality of devices (or processing units). In contrast, a plurality of devices (or processing units) may be combined into one device (or processing unit). Also, a configuration in addition to those as described above may be added to the configuration of each device (or processing unit). In addition, if the configuration or operation is substantially the same as the whole system, a part of a configuration of a certain device (or processing unit) may be included in another device (or processing unit). Also, the present invention is not limited to the above-described embodiments, and diverse modifications can be made without departing from the scope of the invention.

The present application contains subject matter related to that disclosed in Japanese Priority Patent Application JP 2009-092683 filed in the Japan Patent Office on Apr. 7, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An encoding apparatus comprising:
   first processing means for performing predetermined first processing of image data to be encoded before performing encoding;
   encoding means for performing the encoding of the image data of which the first processing has been performed by the first processing means to generate a code stream;
   second processing means for performing predetermined second processing of the code stream generated through the encoding of the image data performed by the encoding means; and
   control means for controlling a processing speed of the encoding performed by the encoding means in accordance with a processing speed of the first processing by the first processing means and a processing speed of the second processing by the second processing means, wherein
   the control means acquires the number of zero-bit planes for each code block of the image data, calculates the total sum of the numbers of effective-bit planes for each picture from the number of zero-bit planes, and controls the processing speed of the encoding performed by the encoding means by using the total sum of the numbers of the effective-bit planes for each picture.

2. The encoding apparatus according to claim 1, wherein the control means lowers the processing speed of the encoding if the processing speed of the encoding is higher than the processing speed of the first processing or the processing speed of the second processing.

3. The encoding apparatus according to claim 1, wherein the control means raises the processing speed of the encoding if the processing speed of the encoding is lower than the processing speed of the second processing.

4. The encoding apparatus according to claim 1, wherein the first processing performed by the first processing means includes reading of the image data from a storage unit or receiving of the image data through a network.

5. The encoding apparatus according to claim 1, wherein the second processing performed by the second processing means includes storing of the code stream in a storage unit or transmitting of the code stream through a network.

6. The encoding apparatus according to claim 1, wherein the encoding means is implemented by a processor having a plurality of cores, and the control means controls the processing speed of the encoding by increasing and decreasing the number of cores allocated to the encoding.

7. The encoding apparatus according to claim 1, wherein the encoding means performs the encoding by a reversible encoding method.

8. The encoding apparatus according to claim 1, wherein the encoding means performs the encoding by JPEG2000 type reversible encoding method.

9. The encoding apparatus according to claim 1, further comprising an adding means for adding load control information regarding the control of the processing speed of the encoding performed by the control means to the code stream.

10. An encoding method comprising the steps of:
  causing a first processing means of an encoding apparatus to perform predetermined first processing of image data to be encoded before performing encoding;
  causing an encoding means of the encoding apparatus to perform the encoding of the image data of which the first processing has been performed by the first processing means to generate a code stream;
  causing a second processing means of the encoding apparatus to perform predetermined second processing of the code stream generated through the encoding of the image data performed by the encoding means; and
  causing a control means of the encoding apparatus to control a processing speed of the encoding performed by the encoding means in accordance with a processing speed of the first processing by the first processing means and a processing speed of the second processing by the second processing means, wherein
  the control means acquires the number of zero-bit planes for each code block of the image data, calculates the total sum of the numbers of effective-bit planes for each picture from the number of zero-bit planes, and controls the processing speed of the encoding performed by the encoding means by using the total sum of the numbers of the effective-bit planes for each picture.

11. An encoding apparatus comprising:
  a first processing unit performing predetermined first processing of image data to be encoded before performing encoding;
  an encoding unit performing the encoding of the image data of which the first processing has been performed by the first processing unit to generate a code stream;
  a second processing unit performing predetermined second processing of the code stream generated through the encoding of the image data performed by the encoding unit; and
  a control unit controlling a processing speed of the encoding performed by the encoding unit in accordance with a processing speed of the first processing by the first processing unit and a processing speed of the second processing by the second processing unit, wherein
  the control unit acquires the number of zero-bit planes for each code block of the image data, calculates the total sum of the numbers of effective-bit planes for each picture from the number of zero-bit planes, and controls the processing speed of the encoding performed by the encoding unit by using the total sum of the numbers of the effective-bit planes for each picture.

* * * * *